(12) United States Patent
Yatsuda et al.

(10) Patent No.: US 9,606,351 B2
(45) Date of Patent: Mar. 28, 2017

(54) VEHICLE HEADLIGHT HAVING SCANNING LASER SOURCE

(71) Applicant: Stanley Electric Co., Ltd., Tokyo (JP)

(72) Inventors: Yasushi Yatsuda, Tokyo (JP); Hiroshi Hirasawa, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 159 days.

(21) Appl. No.: 14/583,587

(22) Filed: Dec. 26, 2014

(65) Prior Publication Data

US 2015/0175054 A1  Jun. 25, 2015

(30) Foreign Application Priority Data

Dec. 25, 2013 (JP) .................. 2013-266599

(51) Int. Cl.
| | |
|---|---|
| B60Q 1/076 | (2006.01) |
| G02B 26/08 | (2006.01) |
| G02B 26/10 | (2006.01) |
| B60Q 1/08 | (2006.01) |
| F21S 8/10 | (2006.01) |

(52) U.S. Cl.
CPC .......... *G02B 26/105* (2013.01); *B60Q 1/085* (2013.01); *F21S 48/1145* (2013.01); *F21S 48/1258* (2013.01); *F21S 48/1757* (2013.01); *B60Q 2300/112* (2013.01); *B60Q 2300/114* (2013.01); *B60Q 2300/314* (2013.01); *B60Q 2300/324* (2013.01); *B60Q 2300/41* (2013.01); *B60Q 2300/42* (2013.01); *B60Q 2300/45* (2013.01)

(58) Field of Classification Search
CPC ............... F21V 14/04; F21V 14/045; F21V 23/003–23/009; F21W 2101/10; B60Q 1/076; H01S 3/0071; H01S 3/025; G02B 26/0858; F21S 48/1757
See application file for complete search history.

(56) References Cited

U.S. PATENT DOCUMENTS

| | | | | |
|---|---|---|---|---|
| 5,550,669 | A * | 8/1996 | Patel .................... | G02B 7/1821 248/485 |
| 5,579,148 | A * | 11/1996 | Nishikawa ........... | G02B 26/101 235/462.36 |
| 6,049,407 | A * | 4/2000 | Melville ............ | G02B 26/0858 359/198.1 |
| 7,009,748 | B2 * | 3/2006 | Turner ................. | G02B 7/1821 347/260 |
| 7,390,100 | B2 * | 6/2008 | Nagashima ........ | G02B 26/0825 359/226.1 |
| 7,446,911 | B2 * | 11/2008 | Asai ................... | G02B 26/0833 358/474 |

(Continued)

*Primary Examiner* — Ismael Negron
(74) *Attorney, Agent, or Firm* — Kenealy Vaidya LLP

(57) ABSTRACT

A vehicle headlight includes a light source, a wavelength converting member and a mirror mounted on a movable frame unit configured to rotate the mirror about two orthogonal axes. Light emitted by the light source is reflected by the mirror such that rotation of the mirror by the movable frame unit scans the reflected light in two directions at a substantially right angle with respect to each other and/or direct the reflected light towards the wavelength converting member to provide various color lights The movable frame unit might be actuated by an AC voltage having a low frequency.

18 Claims, 26 Drawing Sheets

(56) References Cited

U.S. PATENT DOCUMENTS

| | | | | |
|---|---|---|---|---|
| 7,636,101 B2 * | 12/2009 | Sprague | ................... | B41J 2/471 |
| | | | | 347/243 |
| 8,300,290 B2 * | 10/2012 | Maekawa | .......... | G02B 26/0858 |
| | | | | 359/200.8 |
| 8,437,061 B2 * | 5/2013 | Terada | ................. | B81B 3/0086 |
| | | | | 310/311 |
| 8,456,727 B2 * | 6/2013 | Yasuda | .............. | G02B 26/0858 |
| | | | | 359/199.4 |
| 8,922,861 B2 * | 12/2014 | Koyama | .............. | F21S 48/1145 |
| | | | | 359/199.3 |
| 9,146,014 B2 * | 9/2015 | Sugiyama | ........... | F21S 48/1388 |
| 2009/0237628 A1 * | 9/2009 | Furukawa | .......... | G02B 26/0858 |
| | | | | 353/98 |

* cited by examiner

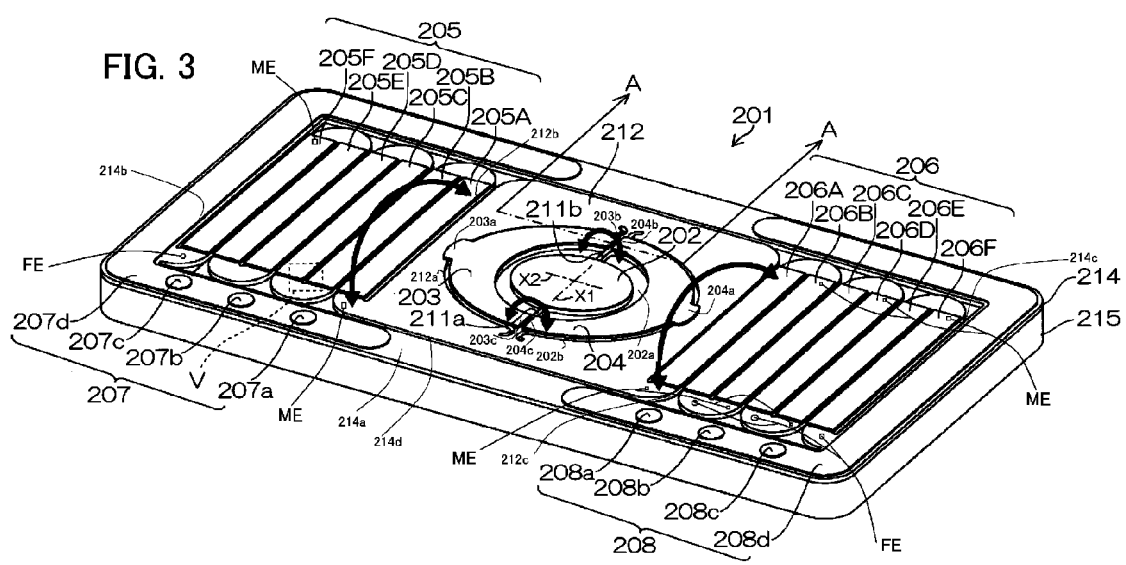

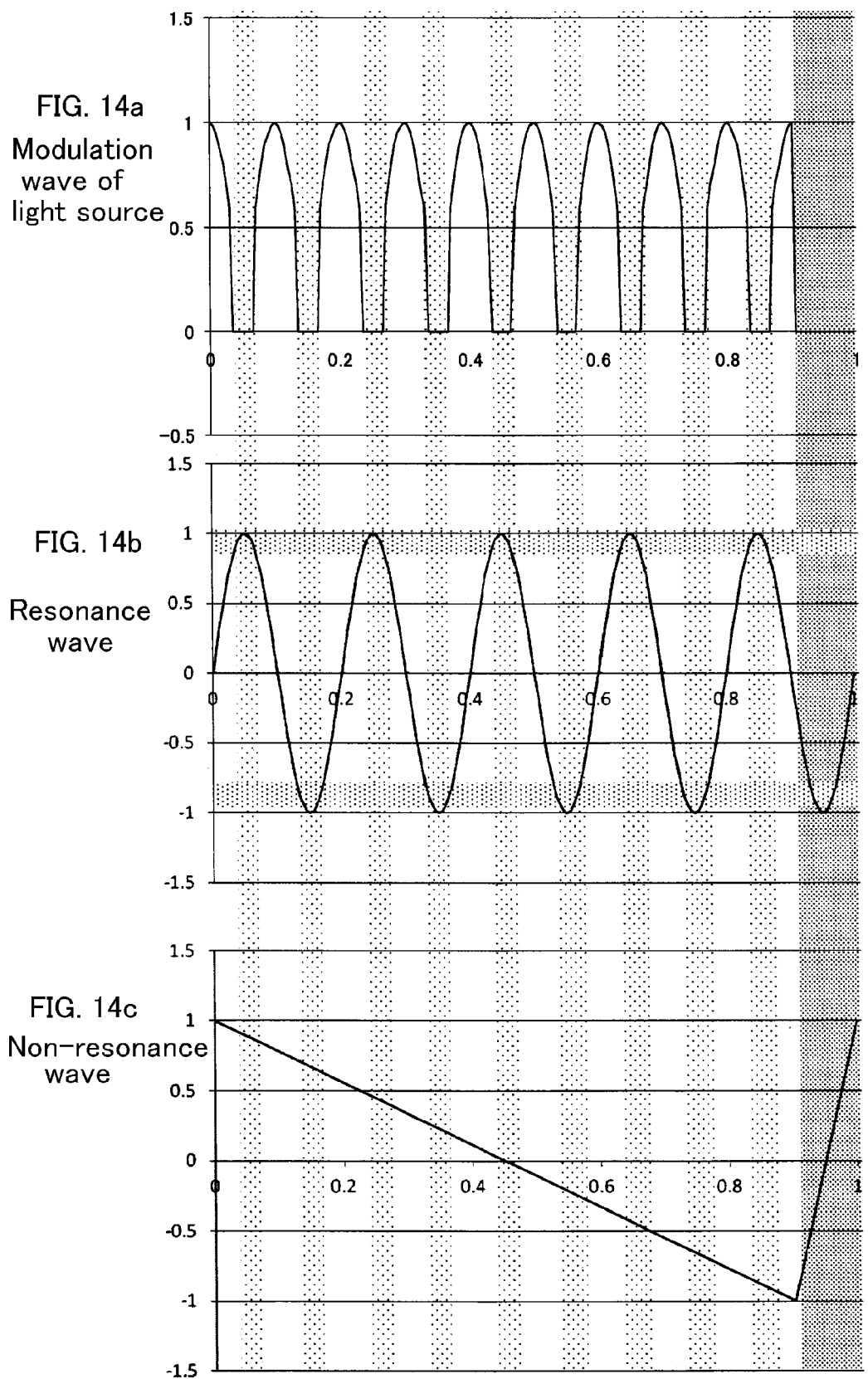

FIG. 15a Horizontal scanning frequency (FH): 24 KHz (Resonance)
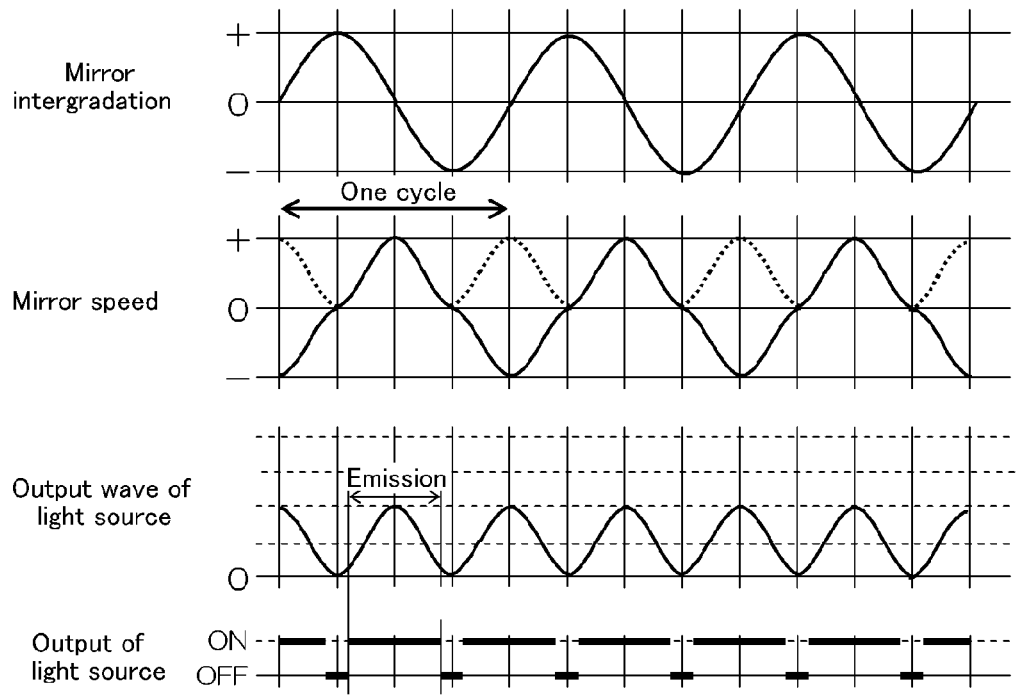
FIG. 15b Vertical scanning frequency (FV): 60 Hz (Non-resonance)
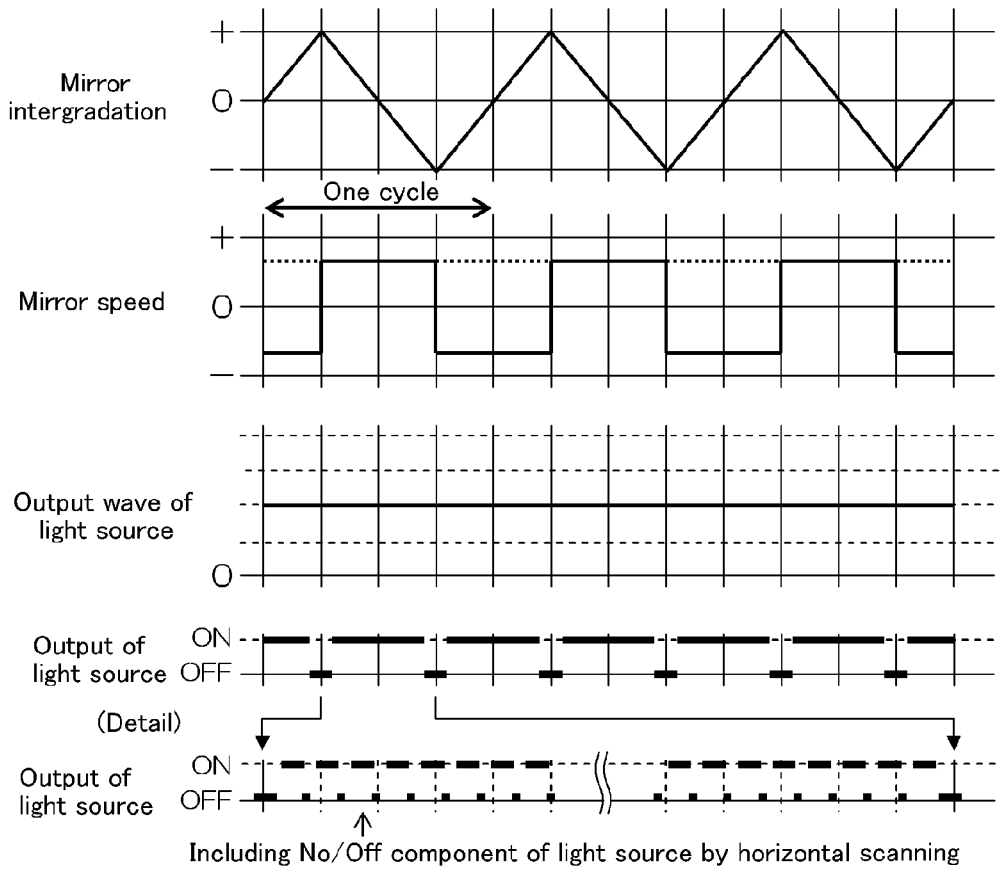
Including No/Off component of light source by horizontal scanning FIG. 16a  Lighting of both directions in a horizontal direction
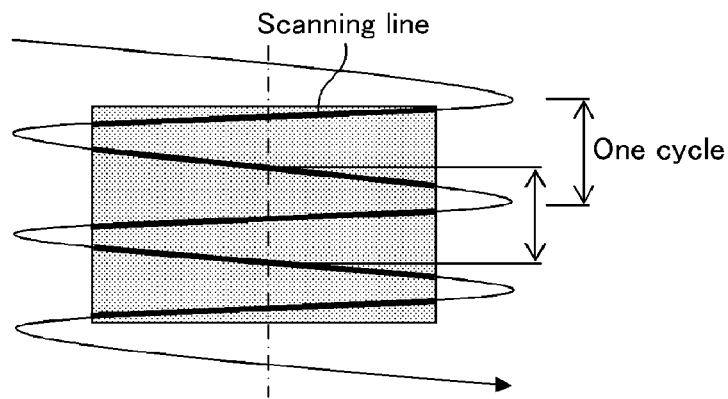
FIG. 16b  Lighting of one direction in a horizontal direction
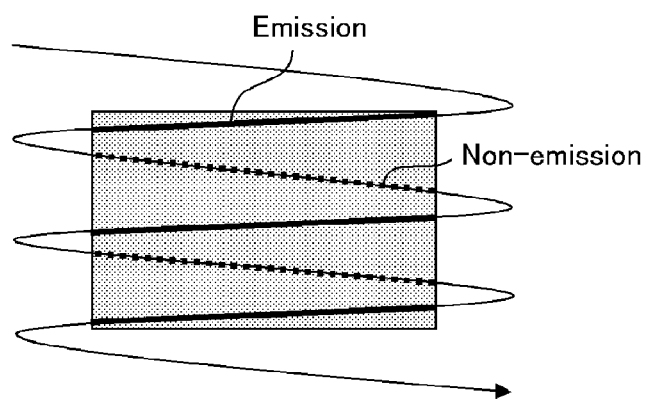
FIG. 16c  Interlace lighting in a horizontal direction
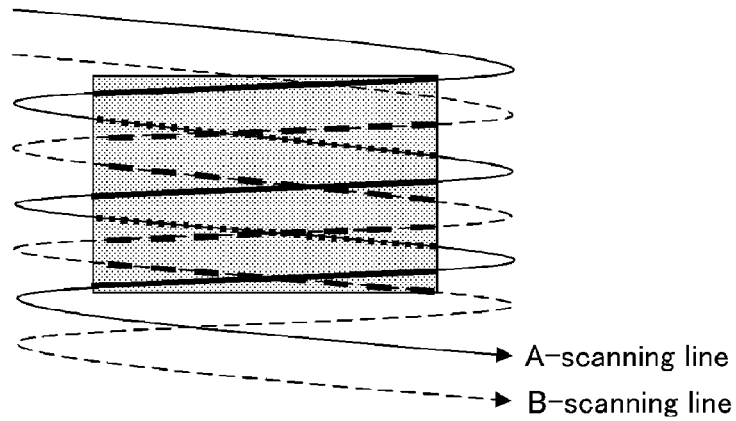

FIG. 19a Minimum horizontal scanning frequency(FH):60 × 50 = 6KHz (Non-resonance)
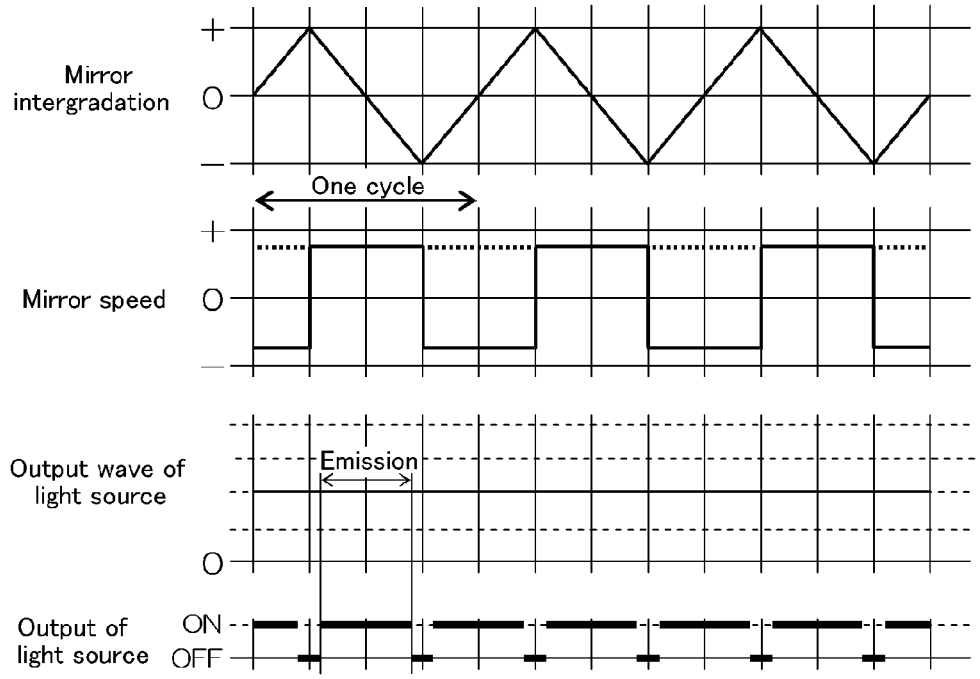
FIG. 19b Vertical scanning frequency (FV): 60 Hz (Non-resonance)
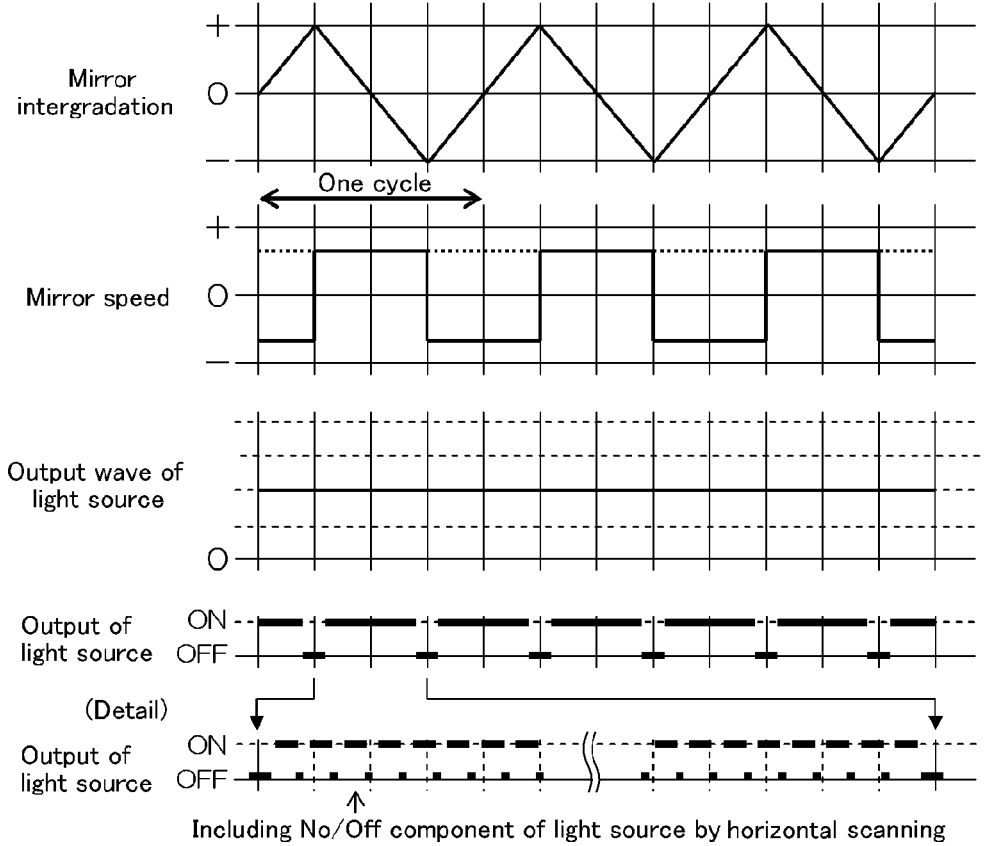
Including No/Off component of light source by horizontal scanning FIG. 21a Horizontal scanning frequency (FH): 24 KHz (Resonance)
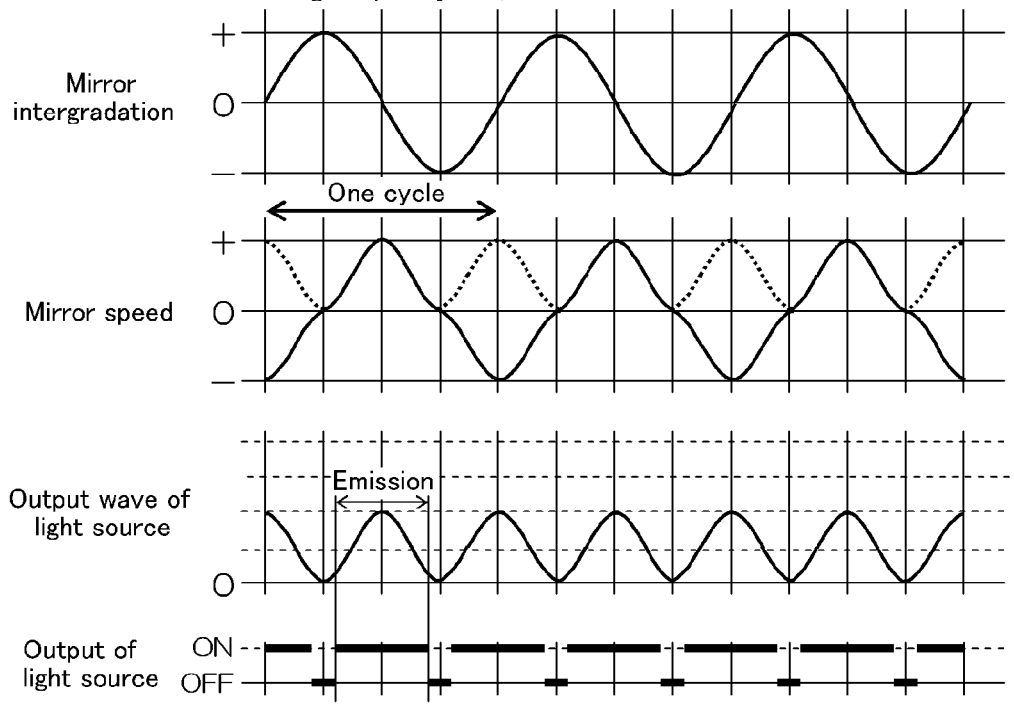
FIG. 21b Vertical scanning frequency (FV): 12 Hz (Resonance)
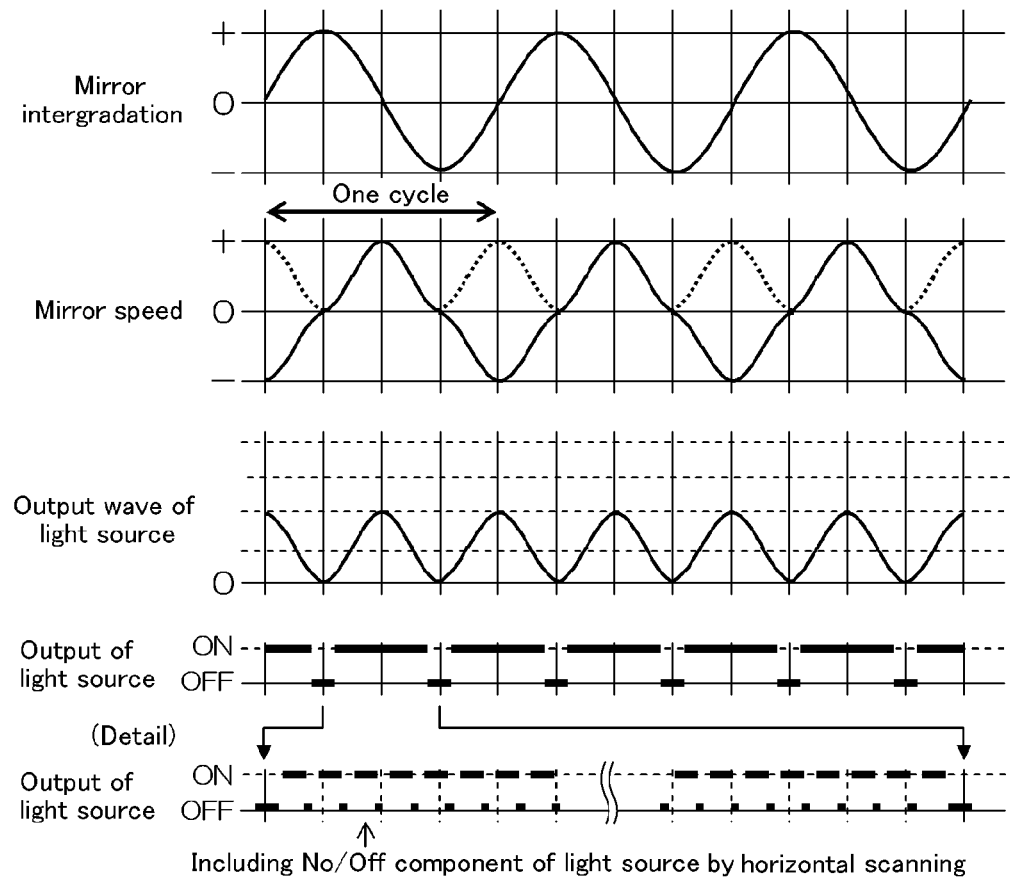
Including No/Off component of light source by horizontal scanning Table

| Light intensity | 0 ~ 60 lx | 60 ~ 300 lx | 300 ~ 2,000 lx | 2,000 lx ~ |
|---|---|---|---|---|
| FV2 | 70Hz | 65Hz | 60Hz | 55Hz |

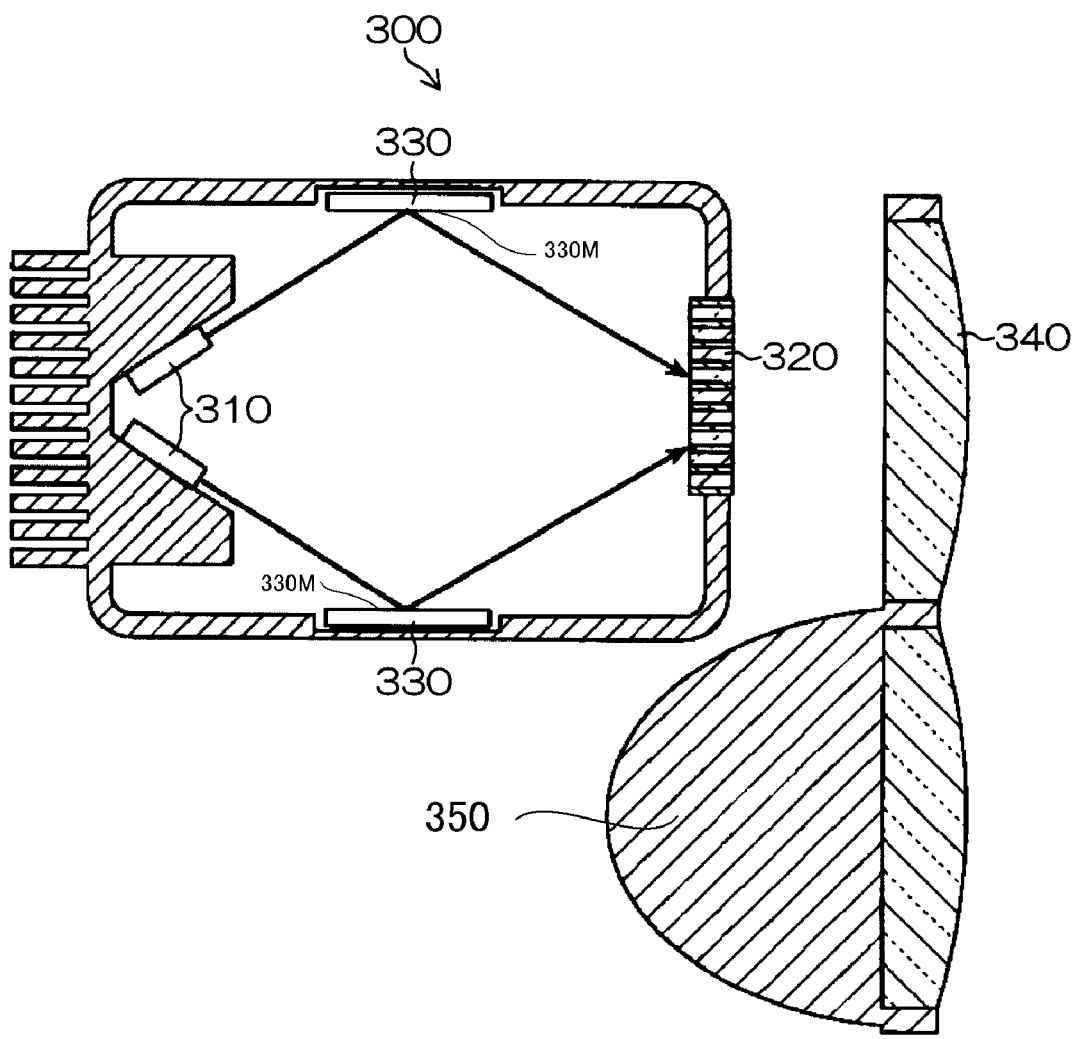
FIG. 24 Conventinal Art

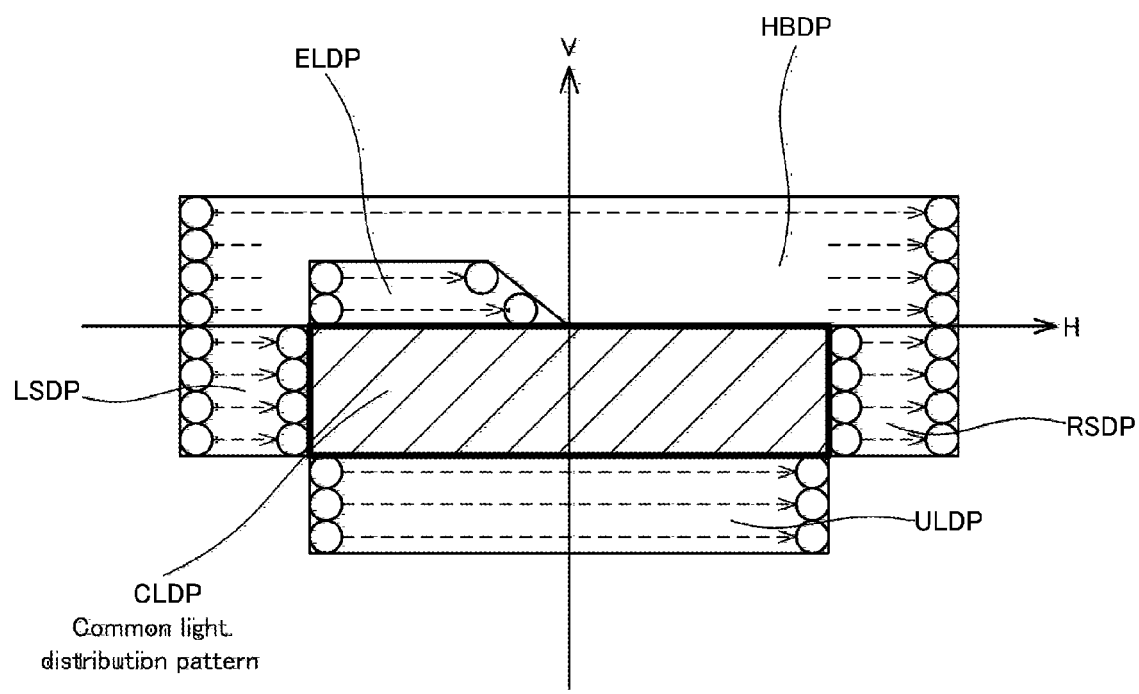
FIG. 25 Conventinal Art ns right or left, the
VEHICLE HEADLIGHT HAVING SCANNING LASER SOURCE This application claims the priority benefit under 35 U.S.C. §119 of Japanese Patent Application No. 2013-266599 filed on Dec. 25, 2013, which is hereby incorporated in its entirety by reference.

BACKGROUND

1. Field

The presently disclosed subject matter relates to optical deflector apparatuses and vehicle headlights including the optical deflector apparatus, and more particularly to rotary mirror optical deflector apparatuses having a high reliability and a long life, which can be easily manufactured with a high accuracy by using Micro-Electro-Mechanical System (MEMS) technology, and a vehicle headlight including the optical deflector apparatus having a high visibility without a flicker of light, even when the optical deflector apparatus is driven by a comparative low frequency to maintain the high reliability and the long life.

2. Description of the Related Art

An optical deflector apparatus, which incorporates a light source such as a laser diode and the like, has been used as a light-emitting scanner for a projector, a bar-code reader, a laser printer, a head-up display, etc. A vehicle headlight, which uses the optical deflector apparatus including a rotary mirror optical deflector that is made by using Micro-Electro-Mechanical System (MEMS) technology, is disclosed in Patent Document No. 1 (US Patent Publication No. 2011-0249460-A1). FIG. 24 is a schematic cross-sectional view depicting a conventional headlight including the optical deflector apparatus, which is disclosed in Patent Document No. 1.

The conventional headlight 300 includes: a common projector lighting 350 projecting a common light distribution pattern; a pair of laser devices 310 each having an optical axis emitting laser beams along each of the optical axes; a pair of optical deflectors 330 each having a rotatable mirror 330M in two dimensional directions, which intersect with respect to each other at a substantially right angle, each of the rotatable mirrors 330M intersecting with a respective one of the optical axes of the laser devices 310, and each of the pair of optical deflectors 330 facing with respect to each other; a phosphor panel 320 including at least one wavelength converting material, being located opposite the pair of laser devices 310 with reference to the pair of optical deflectors 330; a projector lens 340; and wherein each of the pair of optical deflectors 330 scans the laser beam emitted from a respective one of the pair of laser devices 310 in the two dimensional directions toward the phosphor panel 320, the phosphor panel 320 wavelength-convert said scanned laser beam into light having a substantially white color tone and the light having the substantially white color tone is projected in a light-emitting direction of the headlight 300 via the projector lens 340.

FIG. 25 is a front view showing an exemplary light distribution pattern on an imaginary screen, which is projected by the conventional headlight 300. The conventional headlight 300 may provide the common light distribution pattern CLDP by turning on the common projector lighting 350, and also may provide various light distribution patterns by scanning the laser light emitted from the respective one of the pair of laser devices 310 in the two dimensional directions toward the phosphor panel 320 with each of the rotatable mirrors 330M in accordance with traffic conditions.

For example, when vehicles do not exist in a forward direction of a subject vehicle incorporating the headlight 300, the headlight 300 may provide an elbow light distribution pattern ELDP in addition to the common light distribution pattern CLDP to improve a view in the forward direction of the subject vehicle, while preventing an emission of a glare type light toward oncoming vehicles. When the vehicles do not also exist on an oncoming lane as well as a driving lane in the forward direction of the subject vehicle, the headlight 300 may provide a high beam distribution pattern HBDP to further improve the view in the forward direction of the subject vehicle.

In addition, when the subject vehicle turns right or left, the headlight 300 may provide a right side distribution pattern RSDP or a left side distribution pattern LSDP to improve a view of corner in a rightward or leftward direction of the subject vehicle, respectively. When a driver of the subject vehicle drives under a rainy weather, the headlight 300 may emit an under light distribution pattern ULDP for the driver to improve a view of near portion in the forward direction of the subject vehicle so as to be able to prevent repelling water toward pedestrians.

As a conventional optical deflector made by using the MEMS technology, the rotary optical deflectors are disclosed in Patent Document No. 2 (Japanese Patent Application Laid Open JP2005-128,147), Patent Document No. 3 (Japanese Patent No. 4,092,283), Patent Document No. 4 (Japanese Patent No. 4,926,596), etc. FIGS. 26a and 26b are a schematic enlarged top view and a schematic enlarged cross-sectional view for explaining a fundamental principle of the conventional rotary optical deflectors, which are disclosed in Patent Documents No. 2 to No. 4, respectively.

The conventional optical deflector 200 includes: a mirror 231 configured to reflect a laser beam; an inner frame 223 formed in a shape of picture frame, and supporting the mirror 231 via a first pair of torsion bars 240A and 240B, each of the first torsion bars 240A and 240B located between the inner frame 223 and the mirror 231 and being located opposite to one another so as to rotate the mirror 231 in a turning direction of the first torsions bards 240A and 240B with a first actuator; an outer frame 221 also formed in a substantially shape of picture frame, and supporting the inner frame 223 along with the mirror 231 via a second pair of torsion bars 250A and 250B, each of the second torsion bars 250A and 250B located between the inner frame 223 and the outer frame 221 and located opposite to one another so as to rotate the mirror 231 in a direction perpendicular to the turning direction of the first torsions bards 240A and 240B with a second actuator; and therefore a first space 222 A included between the mirror 231 and the inner frame 223, and also a second space 222B included between the inner frame 223 and the outer frame 221.

The conventional optical deflector 200 can rotate the mirror 231 in two dimensional directions, which are perpendicular to each other. By combining the mirror 231, which may rotate in the two dimensional directions, with a light source such as a laser diode and the like, an optical deflector apparatus may be used as a light-emitting scanner for a projector, a bar-code reader, a laser printer, a head-up display, etc. The optical deflector apparatus including the light source may also be used as a light source for vehicle headlights, which can provide drivers with favorable light distribution patters in accordance with various road conditions, as described above with reference to Patent Document No. 1.

When the optical deflector is used as the light-emitting scanner for vehicle lamps, which may prevent a flicker of light emitted from the vehicle lamps, for example, Non-Patent document No. 1 (ISAL 2013 Page 340 to 347 [Glare-free High Beam with Beam-scanning]) discloses that the optical deflector should be driven by a power supply having a frequency of 220 Hz or more (or frame rate of 220 frame per second). However, the optical deflector is required to be driven by a lower frequency (e.g., less than 100 Hz) in view of reliability, a life, durability and the like of the vehicle lamps.

The above-referenced Patent Documents, additional Patent Documents and Non-Patent Document are listed below, and Japanese Patent Documents therein are hereby incorporated with their English abstracts in their entireties.
1. Patent Document No. 1: U.S. Patent Publication No. 2011-0249460-A1
2. Patent Document No. 2: Japanese Patent Application Laid Open JP2005-128,147
3. Patent Document No. 3: Japanese Patent No. 4,092,283
4. Patent Document No. 4: Japanese Patent No. 4,926,596
5. Non-Patent Document No. 1: ISAL 2013 Page 340 to 347 [Glare-free High Beam with Beam-scanning]
6. Patent Document No. 5: Japanese Patent No. 4,138,196
7. Patent Document No. 6: Japanese Patent No. 4,807,901
8. Patent Document No. 7: Japanese Patent No. 4,662,112
9. Non-Patent Document No. 2: ISAL 2013 Page 262 to 266 [Flickering effects of vehicle exterior light systems and consequences]
10. Patent Document No. 8: U.S. Pat. No. 8,345,096
11. Patent Document No. 9: U.S. Patent Publication No. 2013-0,242,100-A1

The disclosed subject matter has been devised to consider the above and other problems, features, and characteristics. Thus, embodiments of the disclosed subject matter can include optical deflector apparatuses having a high reliability and a long life, which can be used as a lighting unit for vehicle lamps such as a headlight. The disclosed subject matter can also include optical deflector apparatuses having a high reliability, which can emit scanned beams having various color tones including a while color tone by associating a wavelength converting member including a wavelength converting material with a light source such as a laser diode, a light-emitting diode and the like so as to be able to be used for a stage lighting, a room lighting for warming up events and the like in addition to the vehicle lamps.

SUMMARY

The presently disclosed subject matter has been devised in view of the above and other problems, features, and characteristics. An aspect of the disclosed subject matter includes optical deflector apparatuses having a high reliability and a long life, which can be driven by an alternating-current (AC) voltage having a lower frequency without flickers of light, and which can scan various color lights including a white color tone by associating a wavelength converting member with a light source. Another aspect of the disclosed subject matter includes vehicle headlights using the optical deflector apparatus having a higher reliability and a longer life, which can be used as a lighting unit for vehicle lamps such as a headlight, and which can provide favorable light distribution patterns in accordance with various road conditions.

According to an aspect of the disclosed subject matter, an optical deflector apparatus can include: a light source emitting a laser beam; an optical deflector including: a mirror having a first central axis and a second central axis intersecting with respect to each other at a right angle, receiving the laser beam emitted from the light source and scanning the laser beam during operation; a movable frame surrounding the mirror, and be configured to rotate the mirror with reference to the first central axis by using a first pair of piezoelectric cantilever actuators; an outer frame surrounding the movable frame, and being configured to rotate the movable frame along with the mirror with reference to the second central axis by using a second pair of piezoelectric cantilever actuators, wherein at least one of the first pair of piezoelectric cantilever actuators and the second pair of piezoelectric cantilever actuators includes a plurality of piezoelectric cantilevers; a control system including: a light source driver being configured to emit the laser beam; a mirror driver being configured to drive the first pair of piezoelectric cantilever actuators with a first alternating-current (AC) voltage having a first frequency and a reverse phase of the first frequency and being configured to drive the second pair of piezoelectric cantilever actuators with a second AC voltage having a second frequency and a reverse phase of the second frequency; and a controller being configured to control the light source driver and the mirror driver; and wherein the first frequency of the first AC voltage is higher than the second frequency of the second AC voltage, and a wave shape of half cycle of the second AC voltage is a non-symmetric wave shape.

In the above-described exemplary optical deflector apparatus, the second AC voltage having the non-symmetric wave shape can be a saw-tooth wave, and the second AC voltage can also be a saw-tooth wave having a frequency of 100 Hz or less to improve reliability, a life, etc.

According to a variation of the aspect of the disclosed subject matter, an optical deflector apparatus can include: a light source emitting a laser beam; an optical deflector including: a mirror having a first central axis and a second central axis intersecting with respect to each other at a right angle, receiving the laser beam emitted from the light source and scanning the laser beam during operation; a movable frame surrounding the mirror, and be configured to rotate the mirror with reference to the first central axis by using a first pair of piezoelectric cantilever actuators via a first pair of torsion bars connecting between the mirror and the movable frame; an outer frame surrounding the movable frame, and being configured to rotate the movable frame along with the mirror with reference to the second central axis by using a second pair of piezoelectric cantilever actuators via a second pair of torsion bars connecting between the movable frame and the outer frame; a control system including: a light source driver being configured to emit the laser beam; a mirror driver being configured to drive the first pair of piezoelectric cantilever actuators with a first AC voltage having a first frequency and a reverse phase of the first frequency and being configured to drive the second pair of piezoelectric cantilever actuators with a second AC voltage having a second frequency and a reverse phase of the second frequency; and a controller being configured to control the light source driver and the mirror driver; and wherein the first frequency of the first AC voltage is higher than the second frequency of the second AC voltage, and the second frequency of the second AC voltage is a resonance frequency of less than 100 Hz, which is a substantially mechanical resonance frequency of the movable frame.

In the above-described exemplary optical deflector apparatuses, the optical deflector apparatus can further include a wavelength converting member including at least one wavelength converting material being configured to pass through the laser beam scanned by the mirror of the optical deflector and being configured to wavelength-convert said scanned laser beam into light having a different wavelength from a light-emitting wavelength of the scanned laser beam. In this case, the light source can be a laser device configured to emit blue light and the wavelength converting member can include a wavelength converting material that is selected from the group consisting of a yellow phosphor, and two phosphors including a red phosphor and a green phosphor to emit said laser beam having a white color tone, the light source can be a laser device configured to emit ultraviolet light and the wavelength converting member can include a wavelength converting material including at least one of a red phosphor, a green phosphor and a blue phosphor to emit the laser beam having various color tones, and also a projector lens can be configured to allow the scanned laser beam to pass through to provide particular light distributions.

According to the exemplary optical deflector apparatuses, at least the second pair of piezoelectric cantilever actuators can be driven by the second AC voltage having a low frequency of 100 Hz or less. Therefore, the disclosed subject matter can provide optical deflector apparatuses having a high reliability and a long life because of a low frequency drive, which can scan various color lights including a white color tone by associating the wavelength converting member with the light source so as to be used for a stage lighting, a room lighting for warming up events, etc.

Another aspect of the disclosed subject matter, a vehicle headlight including the optical deflector apparatus can further include a projector lens being configured to pass through the scanned laser beam, wherein the first central axis of the mirror of the optical deflector is located in a substantially vertical direction with reference to a driving road, the second central axis of the mirror of the optical deflector is located in a substantially horizontal direction with reference to the driving road, and the scanned laser beam is projected in a forward direction of the vehicle headlight via the projector lens.

In the above-described exemplary vehicle headlight including the optical deflector apparatus, the headlight can further include a camera photographing in a forward direction of a subject vehicle incorporating the vehicle headlight, and outputting photographing data to the controller of the control system, wherein the controller is configured to vary at least a projecting shape of the scanned laser beam in accordance with the photographing data by using the light source driver and the mirror driver to provide favorable light distribution patterns in accordance with various road conditions. Additionally, the headlight can further include a speed sensor detecting a speed of a subject vehicle incorporating the vehicle headlight and outputting said speed data to the controller of the control system, wherein the controller is configured to vary the second frequency of the second AC voltage in accordance the speed data by using the mirror driver, and also can further include a light intensity sensor detecting a light intensity in a light-emitting direction of the scanned laser beam, and outputting said light intensity data to the controller of the control system, wherein the controller is configured to vary the second frequency of the second AC voltage in accordance the light intensity data by using the mirror driver to further shorten at least a horizontal scanning frequency.

According to the above-described exemplary vehicle headlight, at least the horizontal scanning frequency, which corresponds to the frequency of the second AC voltage, can further be shortened in accordance with the speed data and the light intensity data input into the controller. Thus, the disclosed subject matter can provide vehicle headlights using the optical deflector apparatus having a higher reliability and a longer life, which can be used as a lighting unit for vehicle lamps such as a headlight, and which can provide favorable light distribution patterns in accordance with various road conditions.

BRIEF DESCRIPTION OF THE DRAWINGS

These and other characteristics and features of the disclosed subject matter will become clear from the following description with reference to the accompanying drawings, wherein:

FIG. 3 is an enlarged perspective view depicting a first exemplary optical deflector of the optical deflector apparatuses shown in FIG. 1 and FIG. 2;

FIGS. 14a to 14c are charts showing an exemplary modulation wave of the light source synchronizing with a rotation of the mirror, an exemplary resonance wave applied to the first pair of actuators and an exemplary non-resonance wave applied to the second pair of actuators;

FIGS. 15a and 15b are charts showing an exemplary mirror intergradations, an exemplary mirror speed and an exemplary output of the light source when each of a first exemplary first and second AC voltage is applied to the first pair of actuators, respectively, and are charts showing an exemplary mirror intergradations, an exemplary mirror speed, an exemplary output of the light source and the exemplary output in detail when each of an exemplary third AC voltage having a frequency and a reverse phase of the frequency is applied to the second pair of actuators, respectively;

FIGS. 16a to 16c are explanatory charts depicting each of exemplary lighting methods of both directions and one direction in the horizontal direction and an exemplary interlace lighting method in the horizontal direction using a laser beam emitted from the light source, respectively;

FIGS. 19a and 19b are charts showing an exemplary mirror intergradations, an exemplary mirror speed and an exemplary output of the light source when each of a second exemplary first and second AC voltage is applied to the first pair of actuators, respectively, and are charts showing an exemplary mirror intergradations, an exemplary mirror speed, an exemplary output of the light source and the exemplary output in detail when each of a second exemplary third AC voltage having a frequency and a reverse phase of the frequency is applied to the second pair of actuators, respectively;

FIGS. 21a and 21b are charts showing an exemplary mirror intergradations, an exemplary mirror speed and an exemplary output of the light source when each of a third exemplary first and second AC voltage is applied to the first pair of actuators, respectively, and are charts showing an exemplary mirror intergradations, an exemplary mirror speed, an exemplary output of the light source and the exemplary output in detail when each of a third exemplary third AC voltage having a frequency and a reverse phase of the frequency is applied to the second pair of actuators, respectively;

FIG. 24 is a schematic cross-sectional view depicting a conventional headlight including an optical deflector apparatus;

FIG. 25 is a front view showing an exemplary light distribution pattern on an imaginary screen projected by the conventional headlight shown in FIG. 24.

DETAILED DESCRIPTION OF EXEMPLARY EMBODIMENTS

Figure 1:
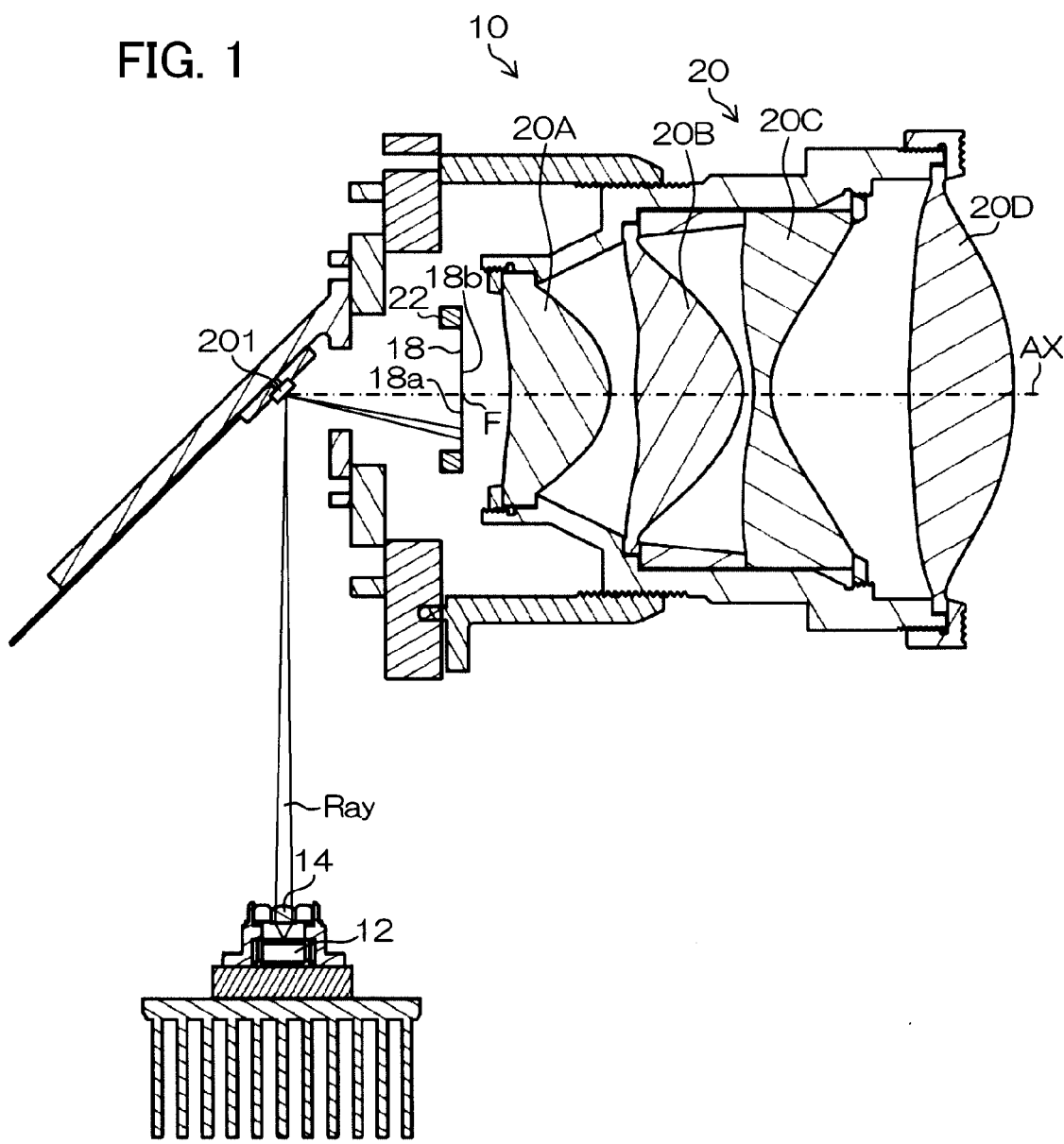
FIG. 1 is a cross-sectional view showing a first exemplary embodiment of a vehicle headlight including an optical deflector apparatus made in accordance with principles of the disclosed subject matter.

Exemplary embodiments of the disclosed subject matter will now be described in detail with reference to FIG. 1 to FIG. 24. FIG. 1 is a cross-sectional view showing a first exemplary embodiment of a vehicle headlight including an optical deflector apparatus made in accordance with principles of the disclosed subject matter. An optical deflector 201 of the optical deflector apparatus can be manufactured by using Micro-Electro-Mechanical System (MEMS) technology as described later.

The vehicle headlight 10 can include: a light source 12 configure to emit a laser beam Ray; a condenser lens 14 located adjacent the light source 12 and focusing the laser beam Ray emitted from the light source 12 so as to be able to use as a scanned light; the optical deflector 201 scanning the laser beam Ray in two dimensional directions, which intersect at a substantially right angle with respect to each other; a wavelength converting member 18 including at least one wavelength converting material and wavelength-converting said laser beam Ray scanned by the optical deflector 201 into a prescribed color light (e.g., white light for the headlight 10); and a projector lens 20 having an optical axis AX and a focus F located on the optical axis AX, projecting various light distribution patterns using the white light, which is scanned in the two dimensional directions via the wavelength converting member 18. The projector lens 20 can include a first lens 20A, a second lens 20B, a third lens 20C and a fourth lens 20D to correct aberration (curvature of field), and also can include one aspheric lens in accordance with a usage.

In this case, the optical deflector 201 can be configured to receive the laser beam Ray emitted from the light source 12 via the condenser lens 14, and the wavelength converting member 18 can be located so that the laser beam Ray scanned by the optical deflector 201 can pass from a rear surface 18a to a front surface 18b of the wavelength converting member 18. When the optical deflector 201 is located in a rearward direction of the wavelength converting member 18 and when the projector lens 20 is located in a forward direction of the wavelength converting member 18 as described above, an optical deflector apparatus of transmission scanning type is frequently called as compared with a reflection scanning type described with reference to FIG. 2 later.

The light source 12 can include a semiconductor light-emitting device such as a laser diode, which emits a laser beam, for example, blue light having a light-emitting wavelength of approximately 450 nanometers as the laser beam Ray, and also such as a laser diode emitting a laser beam of near-ultraviolet light having a light-emitting wavelength of approximately 405 nanometers. Additionally, the light source 12 can also include a light-emitting diode, which emits blue light having a peak wavelength of approximately 450 nanometers. The blue light emitted from the light source 12 can be collimated beam via the condenser lens 14 to enter into the optical deflector 201.

The wavelength converting member 18 can include at least one wavelength converting material to wavelength-converting at least a part of the laser beam, which is scanned by the optical deflector 201, into light having a different wavelength from a wavelength of the laser beam by exciting the at least one wavelength converting material with the laser beam Ray. The wavelength converting member 18 can include a frame 22 made of a glass, a silicone, or similar material, and the frame 22 can incorporate the wavelength converting material. The focus F of the above-described projector lens 20 can be located close to the wavelength converting material of the wavelength converting member 18.

A phosphor can be arranged in plates or laminate, which is formed in a rectangular shape, etc., into the frame 22 as a wavelength converting material for the canned light of the blue laser beam emitted from the light source 12. The phosphor can be a yellow phosphor, which can emit a yellow light being a complementary color of a blue light by exciting the yellow phosphor with the blue laser beam scanned in the tow dimensional directions intersecting at the substantially right angle with respect to each other by the optical deflector 201. Accordingly, a substantially white light can be emitted from the wavelength converting member 18 toward the projector lens 20 by mixing the yellow light of the yellow phosphor with the blue light scanned by the optical deflector 201. The wavelength converting material can be a yellow phosphor, which can include $Y_3Al_5O_{12}:Ce^{3+}$ (YAG), (Sr, Ba)$_2SiO_4:Eu^{2+}$, $Ca_x$ (Si, Al)$_{12}$ (O, N)$_{16}:Eu^{2+}$ and the like. A thickness of the frame 22 incorporating the wavelength converting material can be 50 micrometers or less.

When the light source 12 includes the laser diode emitting the laser beam of near-ultraviolet light having the light-emitting wavelength of approximately 405 nanometers, the wavelength converting material can include: a red phosphor (e.g., $CaAlSiN_3:Eu^{2+}$, $Ca_2Si_5N_8:Eu^{2+}$, $La_2O_2S:Eu^{3+}$, etc.) wavelength-converting the ultraviolet light into red light; a green phosphor (e.g., (Si, Al)$_6$ (O, N):Eu$^{2+}$, $BaMgAl_{10}O_{17}$:Eu$^{2+}$Mn$^{2+}$, etc.) wavelength-converting the ultraviolet light into green light; a blue phosphor (e.g., (Sr, Ca, Ba, Mg)$_{10}$ (PO$_4$)$_6$Cl$_2$:Eu$^{2+}$, $BaMgAl_{10}O_{17}$:Eu$^{2+}$, etc.) wavelength-converting the ultraviolet light into blue light; and wherein the phosphors are arranged in plates or laminate, which is formed in a rectangular shape, etc., into the frame 22 as the at least one wavelength converting material for the near-ultraviolet light scanned by the optical deflector 201.

Accordingly, a substantially white light can be emitted from the wavelength converting member 18 toward the projector lens 20 by mixing the red, green and blue light of the three phosphors with the near-ultraviolet light scanned by the optical deflector 201 due to an additive color mixture using excited lights by the three phosphors. Additionally, because various color lights can be emitted from the projector lens 20 by adjusting each ratio of the three phosphors, the vehicle headlight 10 can be applied not only to headlights, but also vehicle lamps such as a vehicle tail lamp, a turn-signal lamp, a position lamp and their composite lamp, etc. Moreover, the headlight 10 can also be applied to other lighting systems such as a general lighting, a stage lighting, an emergency lighting, etc.

The projector lens 20 can include the first, second, third and fourth lens 20A to 20D to correct the aberration (curvature of field) so that an imaging surface becomes planar when the wavelength converting member 18 is formed in a planar shape and the focus F of the projector lens 20 is located close to the wavelength converting member 18. When the wavelength converting member 18 is formed in a curved shape and when the focus F of the projector lens 20 is located close to the wavelength converting member 18, the projector lens 20 can include the one aspheric lens, which does not correct aberration (curvature of field), so as to be located along the curvature of field.

Figure 2:
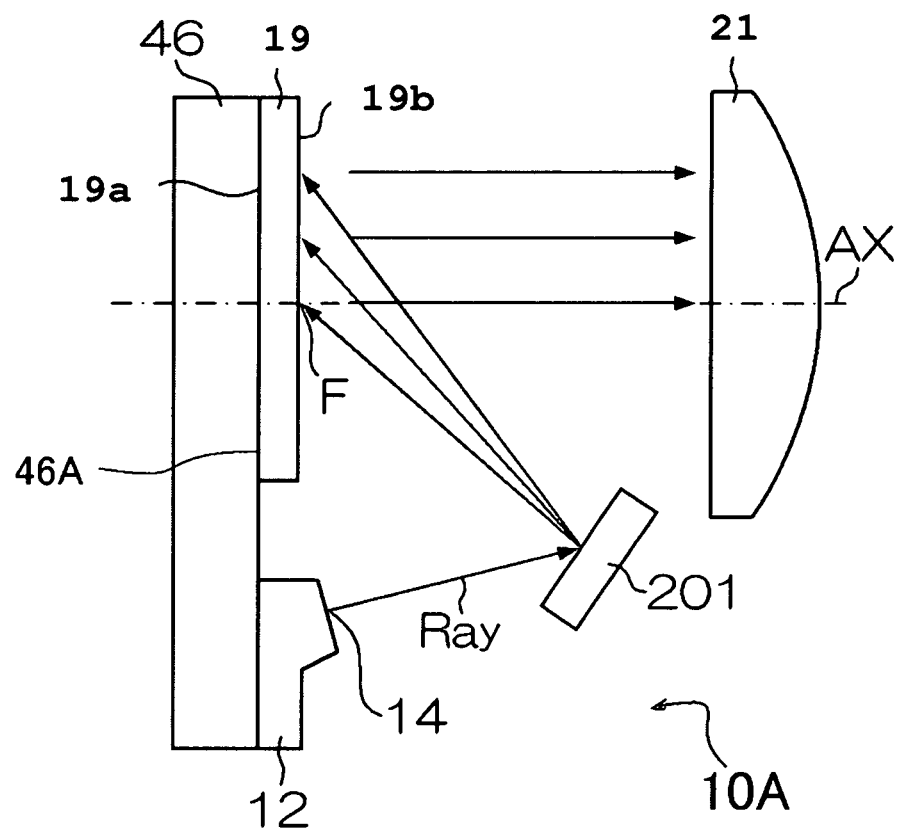
FIG. 2 is a cross-sectional view showing a second exemplary embodiment of a vehicle headlight including an optical deflector apparatus made in accordance with principles of the disclosed subject matter.

A vehicle headlight including an optical deflector apparatus of reflection scanning type will now be described with reference to FIG. 2, in which same or similar elements as these of FIG. 1 use same marks. The vehicle headlight 10A can include: a base board 46 having a mounting surface 46A formed in a planar shape; the light source 12 located on the mounting surface 46A of the base board 46; the condenser lens 14 located adjacent the light source 12 and focusing light emitted from the light source 12 as the laser beam Ray; and the optical deflector 201 scanning the laser beam Ray in the two dimensional directions, which intersect at the substantially right angle with respect to each other; a wavelength converting member 19 including at least one wavelength converting material, reflecting said laser beam Ray on a rear surface 19a thereof and wavelength-converting the laser beam Ray scanned by the optical deflector 201 so as to be able to emit a prescribed color light (e.g., white light for the headlight 10A).

In addition, the vehicle headlight 10A can also include a projector lens 21 having the focus F located on the optical axis AX, projecting various light distribution patterns using the white light, which is scanned in the two dimensional directions via the wavelength converting member 19, and the focus F thereof located close to a front surface 19b of the wavelength converting member 19. The vehicle headlight 10A can enable a length thereof to reduce in a direction of the optical axis AX of the projector lens 21 as compared with the vehicle headlight 10 including the optical deflector 201 of the transmission scanning type.

A first exemplary embodiment of the optical deflector 201 will now be described with reference to FIG. 3. The optical deflector 201 can include: a mirror 202 having a first central axis X1, a second central axis X2 and a pair of tips located on the substantially first central axis X1, being substantially symmetrical with respect to the first central axis X1, and located at a middle portion of the optical deflector 201, and each of the first central axis X1 and the second central axis X2 extending in a direction perpendicular to each other; a movable frame 212 having an inner surface 212a and a pair of outer surfaces 212b and 212c being formed in a substantially rectangular frame shape, the inner surface 212a thereof surrounding the mirror 202 via a first space 202a and a second space 202b, and each of the pair of outer surface 212b and 212c thereof being opposite to each other; an outer frame 214 having a top surface 214a and a pair of inner surfaces 214b and 214c also formed in a substantially rectangular frame shape, and surrounding the movable frame 212 via a third space 214d, and each of the pair of inner surfaces 214b and 214c thereof being opposite to each other; and a pair of torsion bars 211a and 211b each connecting between a respective one of the pair of tips of the mirror 202 and a respective one middle portion of the inner surface 212a of the movable frame 212, each of the respective one middle portion of the inner surface 212a of the movable frame 212 and the respective one of the pair of tips of the mirror 202 being located on the substantially first central axis X1, and the torsion bars 211a and 211b being elastic in a longitudinal direction.

In addition, the optical deflector 201 can also include a first pair of piezoelectric cantilever actuators 203 and 204 each having two movable ends 203b, 203c, 204b and 204c and a fixed end 203a, 204a connected to other respective one middle portion of the inner surfaces 212a of the movable frame 212 that intersects with the second central axis X2, and being possible to rotate the mirror 202 via the pair of torsion bars 211a and 211b by forming the first space 202a between the mirror 202 and each of the first pair of piezoelectric cantilever actuators 203 and 204 formed in a semi-circular arc shape and by forming the second space 202b between the first pair of piezoelectric cantilever actuators 203 and 204 and the inner surface 212a of the movable frame 212, respective ones 203b, 204b and 203c, 204b of the two movable ends 203b, 203c, 204b and 204c of each of the first pair of piezoelectric cantilever actuators 203 and 204 contacting respective ones 211b, 211a of the pair of torsion bars 211a and 211b in the longitudinal directions of the respective ones 211b, 211a of the pair of torsion bars 211a and 211b, respectively.

Moreover, the optical deflector 201 can also include a second pair of piezoelectric cantilever actuators 205 and 206 each including a plurality of piezoelectric cantilevers 205A to 205F and 206A to 206F, a respective one of each of the plurality of piezoelectric cantilevers 205A to 205F and 206A to 206F having a fixed end FE and a movable end ME, a respective one of the movable ends ME of each of the piezoelectric cantilevers 205A and 206A connecting a respective one end of the pair of outer surfaces 212b and 212c of the movable frame 212, respectively, a respective one of the fixed ends FX of each of the piezoelectric cantilevers 205F and 206F connecting a respective one end of the pair of inner surfaces 214b and 214c of the outer frame 214, a respective one of the movable ends ME of each of the piezoelectric cantilevers 205A to 205F and a respective one of the fixed ends FE of each of the piezoelectric cantilevers 205A and 205F alternatively aligning in two substantially parallel lines, respectively, and also a respective one of the movable ends ME of each of the piezoelectric cantilevers 206A to 206F and a respective one of the fixed ends FE of each of the piezoelectric cantilevers 206A and 206F alternatively aligning in two substantially parallel lines, respectively, each of the second pair of piezoelectric cantilever actuators 205 and 206 being located between the respective one of the pair of inner surfaces 214b and 214c of the outer frame 214 and a respective one of the pair of outer surfaces 212b and 212c of the movable inner frame 212 that faces the respective of the pair of inner surfaces 214b and 214c of the outer frame 214 via each of the second pair of piezoelectric cantilever actuators 205 and 206 in a longitudinal direction thereof, each of the plurality of piezoelectric cantilevers 205A to 205F and 206A to 206F of each of the second pair of piezoelectric cantilever actuators 205 and 206 located between the respective of the pair of inner surfaces 214b and 214c of the outer frame 214 and the respective one of the pair of outer surfaces 212b and 212c of the movable frame 212, which faces the respective one of the pair of inner surfaces 214b and 214c of the outer frame 214 via each of the second pair of piezoelectric cantilever actuators 205 and 206, each of the pluralities of piezoelectric cantilevers 205A to 205F and 206A to 206F of each of the second pair of piezoelectric cantilever actuators 205 and 206 being connected in series, and therefore each of the second pair of piezoelectric cantilever actuators 205 and 206 operating as one actuator.

Furthermore, the optical deflector 1 can also include a first electrode group 207 having a first pattern 207a, a second pattern 207b, a third pattern 207c and a fourth pattern 207d and a second electrode group 208 having a fifth pattern 208a, a sixth pattern 208b, a seventh pattern 208c and a eighth pattern 208d, which are formed on at least one of surfaces (e.g., top surface as shown in FIG. 3) of the outer frame 214, the first pattern 207a being electrically connected to one 203 of the first actuators 203 and 204, the second pattern 207b being electrically connected to the piezoelectric cantilevers 205A, 205C and 205E (odd piezoelectric cantilevers of one 205 of the second actuator 205 and 206), the third pattern 207c being electrically connected to the piezoelectric cantilevers 205B, 205D and 205F (even piezoelectric cantilevers of the one 205 of the second actuator 205 and 206), and the fourth pattern 207d being electrically connected to a common electrode for the first, second, third and the fourth pattern 207a, 207b, 207c and 207d, the fifth pattern 208a being electrically connected to the other one 204 of the first actuators 203 and 204, the sixth pattern 208b being electrically connected to the piezoelectric cantilevers 206A, 206C and 206E (odd piezoelectric cantilevers of the other one 206 of the second actuators 205 and 206), the seventh pattern 208c being electrically connected to the piezoelectric cantilevers 206B, 206D and 206F (even piezoelectric cantilevers of the other one 206 of the second actuators 205 and 206), and the eighth pattern 208d being electrically connected to a common electrode for the fifth, sixth, seventh and the eighth pattern 207a, 207b, 207c and 207d, and a base 215 attaching the outer frame 214.

Figure 4A:
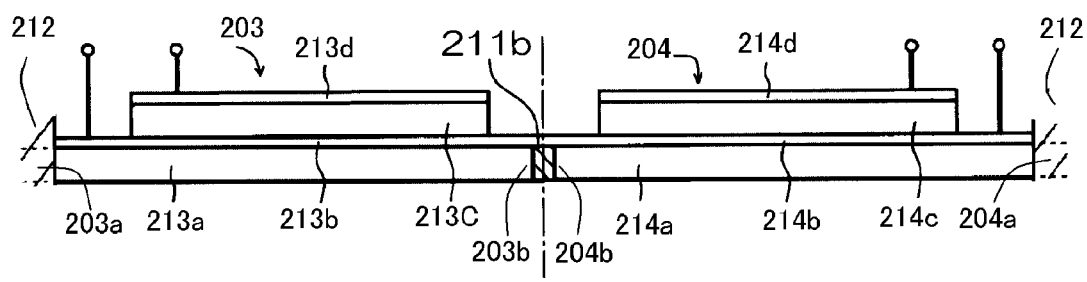
FIGS. 4a and 4b are cross-sectional views showing a first pair of actuators and a torsion bar taken along line A-A shown in FIG. 3 when the first actuators are not provided with a supply voltage and when the first actuators are provided with the supply voltage, respectively.
Figure 4B:
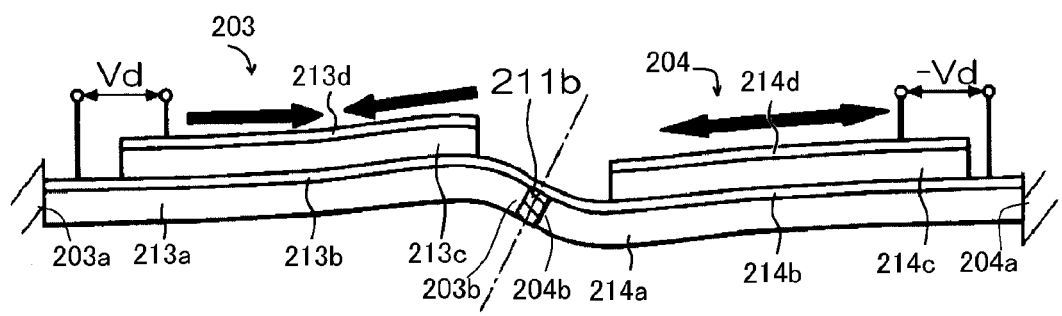

An exemplary method for rotating the mirror 202 with the pair of torsion bars 211a and 211b will now be described with reference to FIGS. 4a and 4b, which are cross-sectional views showing the first pair of actuators 203 and 204 and the torsion bars 21b taken along line A-A shown in FIG. 3 when the first actuators 203 and 204 are not provided with a supply voltage and when the first actuators 203 and 204 are provided with the supply voltage, respectively. The first actuator 203 can include: a supporting layer 213a; a bottom electrode 213b located on the supporting layer 213a; a piezoelectric layer 213c located on the bottom electrode 213b; a top electrode 213d located on the piezoelectric layer 213c; the fixed end 203a connected to the other respective one middle portion of the inner surfaces 212a of the movable frame 212; and the movable end 203b contacting with the torsion bar 211b in the longitudinal direction of the torsion bar 211b.

Similarly, the first other actuator 204 can also include: a supporting layer 214a; a bottom electrode 214b located on the supporting layer 214a; a piezoelectric layer 214c located on the bottom electrode 214b; a top electrode 214d located on the piezoelectric layer 214c; and the fixed end 204a connected to the other respective one middle portion of the inner surfaces 212a of the movable frame 212; and the movable end 204b contacting with the torsion bar 211b in the longitudinal direction of the torsion bar 211b from an opposite direction of the movable end 203b of the first actuator 204. When a voltage supply does not provide the first pair of actuators 203 and 204 with the supply voltage, more properly, between the top electrode 213d and the bottom electrode 213 of the first actuator 203 and between the top electrode 214d and the bottom electrode 214 of the first other actuator 204, the torsion bar 221b may stay without a rotation as shown in FIG. 4a.

When the voltage supply applies a voltage of +Vd between the top electrode 213d and the bottom electrode 213 of the first actuator 203 and applies a voltage of −Vd, which is the voltage of reverse phase applied to the first actuator 203, between the top electrode 214d and the bottom electrode 214 of the first other actuator 204, each of the movable end 203b of the first actuator 203 and the movable end 204b of the first other actuator 204 may inflect in an opposite direction with respect to each other. Each of the other movable end 203c of the first actuator 203 and the movable end 204c of the first other actuator 204 may also inflect with a same displacement as that between movable end 203b and the movable 204b described above in an opposite direction with respect to each other.

Accordingly, when the voltage supply applies the voltage of +Vd between the top electrode 213d and the bottom electrode 213 of the first actuator 203 and applies the voltage of −Vd between the top electrode 214d and the bottom electrode 214 of the first other actuator 204, the mirror 202, in which the respective one of the pair of tips of the mirror 202 is connected to each of the pair of torsion bars 211a and 211b, can be smoothly rotated in a rightward direction with reference to the first central axis X1 thereof by the pair of torsion bars 211a and 211b.

Similarly, when the voltage supply applies the voltage of −Vd between the top electrode 213d and the bottom electrode 213 of the first actuator 203 and applies the voltage of +Vd between the top electrode 214d and the bottom electrode 214 of the first other actuator 204, the mirror 202 can be smoothly rotated in a leftward direction of the above-described reverse direction with reference to the first central axis X1 thereof by the pair of torsion bars 211a and 211b. A displacement angle of the mirror 202 can be varied by adjusting an amount of the supply voltage Vd/−Vd.

Figure 5A:
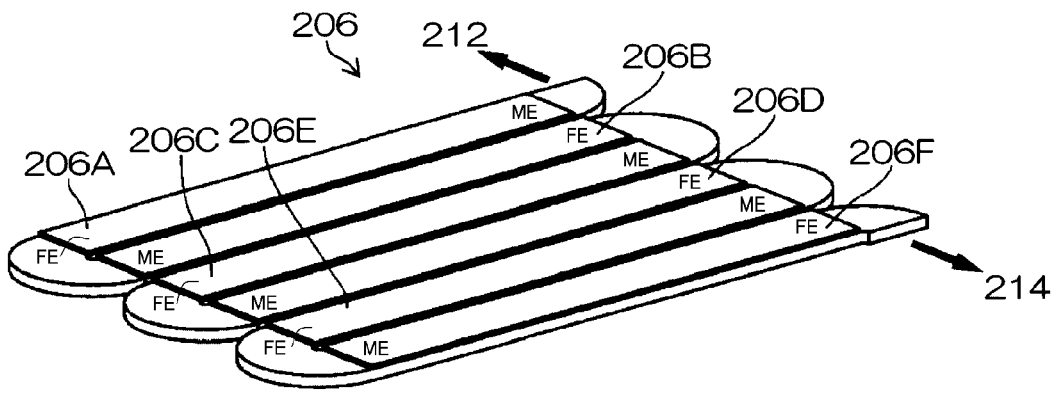
FIGS. 5a and 5b are enlarged perspective views showing a second actuator to explain each operation of the second pair of actuators when the second actuator is not provided with a supply voltage and when the second actuator is provided with the supply voltage, respectively.
Figure 5B:
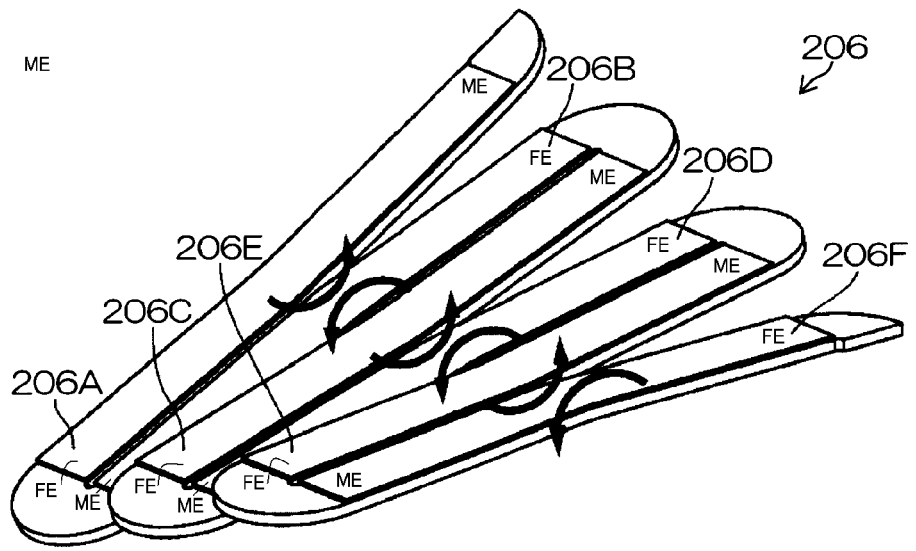

FIGS. 5a and 5b are enlarged perspective views showing the second actuator 206 to explain each operation of the second pair of actuators 205 and 206 when the second actuator 206 is not provided with a supply voltage and when the second actuator is provided with the supply voltage, respectively. In this case, the second pair of actuators 205 and 206 shown in FIG. 3 can be up-side down so that each of the movable ends ME of the piezoelectric cantilevers 205A and 206A, which connects the movable frame 212, connects a respective one up portion of the pair of outer surfaces 212b and 212c of the movable frame 212 in an opposite direction toward the respective one lower portion shown in FIG. 3. Accordingly, in order to facilitate an understanding of movements of the piezoelectric cantilever 206A, FIGS. 5a and 5b show the piezoelectric cantilever 206A made in the opposite direction toward that shown in FIG. 3.

When the voltage supply does not provide the second actuator 206 with a supply voltage, the plurality of piezoelectric cantilevers 206A to 206F may stay without a displacement as shown in FIG. 5a. When the voltage supply provides the second actuator 206 with the supply voltage so as to apply the voltage of +Vd between odd electrodes of the piezoelectric cantilevers 206A, 206C and 206E and so as to apply the reverse voltage−Vd between even electrodes of the piezoelectric cantilevers 206B, 206D and 206F, each of the movable ends ME of the piezoelectric cantilevers 206A, 206C and 206E can inflect upward and each of the movable ends ME of the piezoelectric cantilevers 206B, 206D and 206F can inflect downward.

Thereby, the second actuator 206, in which the fixed end FE of the piezoelectric cantilever 206F adjacent the outer surface 214c of the outer frame 214 connects the outer surface 214c, can inflect the movable end ME of the piezoelectric cantilever 206A with a large amount of displacements due to additions of displacements from the piezoelectric cantilevers 206F to 206A. The other second actuator 205, in which the fixed end FE of the piezoelectric cantilever 205F adjacent the other outer surface 214b of the outer frame 214 connects the outer surface 214b, can also inflect the movable end ME of the piezoelectric cantilever 205A with a same large amount of displacements as the second actuator 206 described above due to said operation.

Accordingly, the second pair of actuators 205 and 206 can rotate the movable frame 212 along with the mirror 202 in an upward direction with reference to the second central axis X2. Similarly, when the voltage supply provides the second actuator 206 with the supply voltage so as to apply the voltage of −Vd between odd electrodes of the piezoelectric cantilevers 206A, 206C and 206E and so as to apply the reverse voltage+Vd between even electrodes of the piezoelectric cantilevers 206B, 206D and 206F and when the voltage supply provides the second other actuator 205 with the supply voltage so as to apply the voltage of −Vd between odd electrodes of the piezoelectric cantilevers 205A, 205C and 205E and so as to apply the reverse voltage+Vd between even electrodes of the piezoelectric cantilevers 205B, 205D and 205F, the second pair of actuators 205 and 206 can rotate the movable frame 212 along with the mirror 202 in a downward direction with reference to the second central axis X2.

Therefore, the optical deflector 201 can smoothly rotate the mirror 202 in the two dimensional directions, which intersect at a substantially right angle with respect to each other, with reference to each of the central axes X1 and X2 by using the first pair of actuators 203 and 204 and the second pair of actuators 205 and 206 by adjusting the voltage of Vd/−Vd provided from the power supply. Thus, the optical deflector 201 can scan the laser beam Ray emitted from the light source 12 via the condenser lens 14 in the two dimensional directions toward each of the wavelength converting members 18 and 19, as shown in FIG. 1 and FIG. 2.

The optical deflector 201, which includes the mirror 202, the pair of torsion bars 211a and 211b, the first pair of actuators 203 and 204, the movable frame 212, the second pair of actuators 205 and 206, the outer frame 214 and the base 215, can be made from one silicone substrate. Exemplary methods for manufacturing the optical deflector 201 will now be described with reference to FIG. 6 to FIG. 8, which show frame formats of manufacturing methods to facilitate an understanding, respectively.

Figure 6:
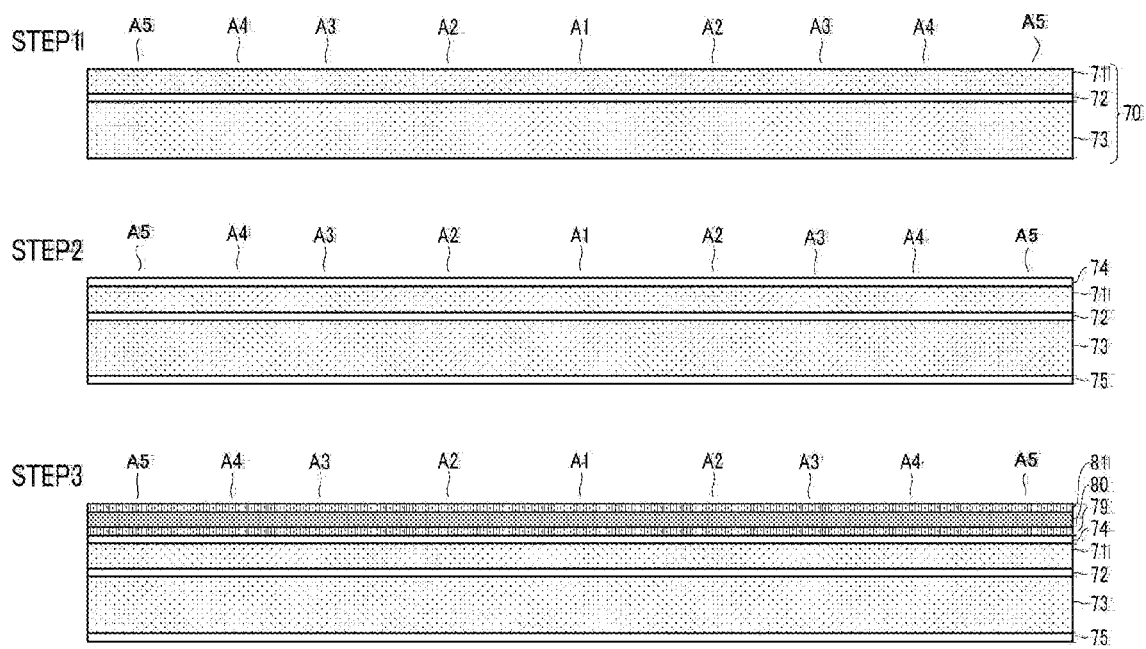
FIG. 6 is an enlarged side cross-sectional view showing STEP1 to STEP3 in an exemplary method for manufacturing the optical deflector shown in FIG. 3.
Figure 7:
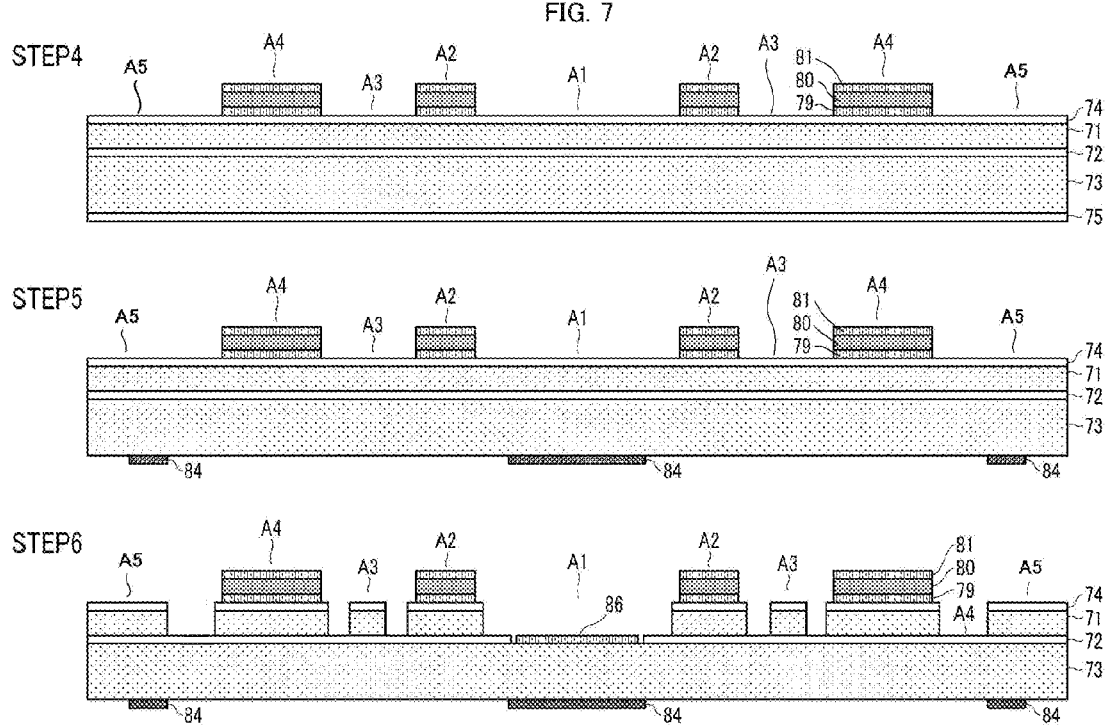
FIG. 7 is an enlarged side cross-sectional view showing STEP4 to STEP6 in the exemplary method for manufacturing the optical deflector shown in FIG. 3.
Figure 8:
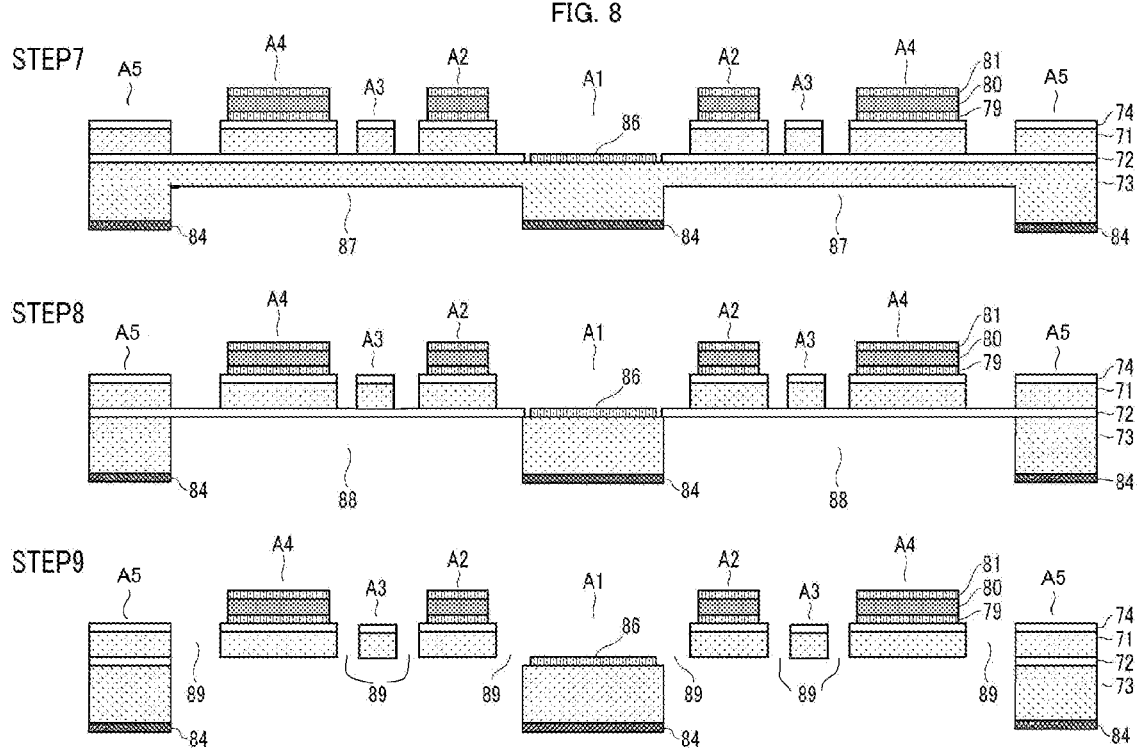
FIG. 8 is an enlarged side cross-sectional view showing STEP7 to STEP9 in the exemplary method for manufacturing the optical deflector shown in FIG. 3.

In FIG. 6 to FIG. 8, because each of the mirror 202, the pair of torsion bars 211a and 211b, the first pair of actuators 203 and 204, the movable frame 212, the second pair of actuator 205 and 206, the outer frame 214 and the base 215 is unfinished, each of marks A1, A2, A3, A4 and A5 is roughly used instead of the above-described element marks 202, 203 and 204, 212, 205 and 206, and 214 and 215, respectively. Each of FIG. 6 to FIG. 8 is different from details of a structure of the optical deflector 1 shown in FIG. 3 because FIG. 6 to FIG. 8 show the frame formats of the manufacturing methods to facilitate an understanding. Additionally, because the pair of torsion bars 211a and 211b may also be incorporated into the movable frame 212 or the mirror 202 and may be manufactured as similar to those 212 and 202, descriptions of the pair of torsion bars 211a and 211b are abbreviated.

STEP 1 is preparing Silicon on Insulator (SOI) substrate 70 including an active layer 71 of single crystal silicone having a thickness of approximately 5 to 100 micro meters, an inter-level oxide layer 72 of silicone oxide having a thickness of approximately 0.5 to 2 micro meters and a handling layer 73 of single crystal silicone having a thickness of approximately 100 to 600 micro meters as a three layers substrate, wherein A1 is a range of configuration of the mirror 202, A2 is a range of configuration of the first pair of actuators 203 and 204, A3 is a range of configuration of the movable frame 212, A4 is a range of configuration of the second pair of actuators 205 and 206, and A5 is a range of configuration of the outer frame 214 and the base 215 as shown in FIG. 6.

STEP 2 is forming a first silicone layer 74 having a thickness of approximately 0.1 to 1 micro meter on the active layer 71 and also forming a second silicone layer 75 having a thickness of approximately 0.1 to 1 micro meter on the handling layer 73 at once by thermally-oxidizing the SOI 70 in a thermal oxidation ingle.

STEP 3 is forming an under electrode layer 79 having two metallic layers on the first silicone layer 74, wherein a first metallic layer located close to the first silicone layer 74 can be formed in thickness of approximately 30 to 100 micro meters using titanium by using a spattering method, an electron beam evaporation method and the like, and wherein a second metallic layer can be formed in thickness of approximately 30 to 100 micro meters on the first metallic layer using platinum by use of a spattering method, an electron beam evaporation method and the like, forming a piezoelectric layer 80 in thickness of approximately 1 to 10 micro meters on the under electrode layer 79 using lead zirconium titanate (LZT) by reactive ion plating as disclosed in Patent Documents No. 6, 7 and 8, and forming an upper electrode 81 in thickness of approximately 10 to 200 micro meters on the piezoelectric layer 80 using platinum (Pt) or gold (Au) by using the spattering method, the electron beam evaporation method and the like.

STEP 4 is shaping the range A2 of the first pair of actuators 203 and 204, which include the under electrode layer 79, the piezoelectric layer 80 and the upper electrode 81, by etching the upper electrode 81, the piezoelectric layer 80 and the under electrode layer 79 and using a reactive ion etching (RIE) machine as a mask, which is formed by patterning a resist material using a photolithographic technique, and is shaping the range A3 of the movable frame 212 and the range A4 of the pair of actuators 205 and 206, which include the under electrode layer 79, the piezoelectric layer 80 and the upper electrode 81 in common with the range A2. And then STEP 4 is forming an upper electrode pattern to connect each of the first pair of actuators 203 and 204 and the second pair of actuators 205 and 206 to the first and second electrode groups 207 and 208, respectively, as described above.

STEP 5 is removing the second silicone layer 75 with a buffered hydrofluoric acid (BHF) while other layers protects with a thick film resistor, forming a thin film aluminum (Al) 84 on the handling layer 73 by the spattering method, the evaporation method and the like, patterning a resist material on the thin film Al 84 using a photolithographic technique, and wet-etching the thin film Al 84 as a mask using the resist material patterned. Thereby, as described in STEP 7 later, each of a rear thin film Al 84 of A1 in the range of configuration of the mirror 202 and a rear thin film Al 84 of A5 in the range of configuration of the outer frame 214 and base 215 can be formed as a hard mask using dry etching method by an Inductive Coupled Plasma (ICP)-RIE machine.

STEP 6 is removing the first silicone layer 74 and the active layer 71 except the ranges A2 to A5 by using a mask, which is a patterned resist material after patterning the above-described resist material using the photolithographic technique, and by using the ICP-RIE machine, which can remove the silicon layers comparatively deeply in a direction perpendicular to the SOI substrate 70. In addition, STEP 6 is also removing the inter-level oxide layer 72 in the range A1 of configuration of the mirror 202 by using the ICP-RIE machine, forming a mirror reflective layer 86 using Au, Pt, Ag, Al and the like in a thickness of 10 to 500 nanometers on the handling layer 73 in the range A1 of configuration of the mirror 202 by a reflective surface forming treatment, and shaping the mirror reflective layer 86 by remaining the mirror reflective layer 86 on the handling layer 73 in the range A1 of configuration of the mirror 202 using a patterned mask of resist material and the dry etching by using the RIE machine, as shown by STEP6 in FIG. 7.

STEP 7 is forming a lower handling layer 87 in the range A2 of configuration of the first pair of actuators 203 and 204, the A3 of configuration of the movable frame 212 and the range A4 of configuration of the second pair of actuators 205 and 206 by etching the handling layer 73 using the hard mask formed in STEP 5 by using the ICP-RIE machine, wherein a difference between thickness of the lower handling layer 87 and the handling layer 73 is approximately 200 micro meters.

STEP 8 is patterning a resistor material in the range A1 of configuration of the mirror 202 and the range A5 of configuration of the outer frame 214 and the base 215, etching the handling layer 87 in the range A2 of configuration of the first pair of actuators 203 and 204, the range A3 of configuration of the movable frame 212 and the range A4 of configuration of the second pair of actuators 205 and 206 using the photolithographic technique, and forming a higher handling layer 88, which is a substantially same level as the inter-level oxide layer 72 of the SOI substrate 70, as shown in FIG. 8.

STEP 9 is removing the higher handling layer 88 and the inter-level layer 72 of the SOI substrate 70 using the BHF by wet-etching, and thereby forming a space 89, the range A1 of configuration of the mirror 202, the pair of torsion bars 211a and 211b (the descriptions thereof are abbreviated as described above), the range A2 of configuration of the first pair of actuators 203 and 204, the range A3 of configuration of the movable frame 212, the range A4 of configuration of the second pair of actuators 205 and 206, the range A5 of configuration of the outer frame 4 and the base 215, which are integrated, so that the mirror 202 rotates via the pair of torsion bars 211a and 211b with reference to the first central axis X1 by inflecting each of the first pair of actuators 203 and 204, and also rotates via the movable frame 212 with reference to the second central axis X2 by inflecting each of the second pair of actuators 205 and 206.

In the first embodiment of the optical deflector 201 shown in FIG. 3, the first actuator 203 can be provided with a first alternating-current (AC) voltage as a driving voltage, and the first other actuator 204 can be provided with a second AC voltage having an opposite phase with respect to a phase of the first AC voltage. In this case, each frequency of the first AC voltage and the second AC voltage can be a substantially resonance frequency of the mirror 202 including the first pair of actuators 203 and 204, and the first pair of actuators 203 and 204 can be resonant-driven. Thereby, the first pair of actuators 203 and 204 can rotate the mirror 202 with reference to the first central axis X1, and the mirror 202 can scan the laser beam Ray emitted from the light source 12 in a direction toward the wavelength converting member 18 as described above.

In addition, each of the second pair of actuators 205 and 206 can be provided with a third AC voltage as a driving voltage so that a frequency of the third AC voltage is a lower predetermined frequency than a resonance frequency of the mirror 202, the first pair of actuators 203 and 204 and the movable frame 212 including the second pair of actuators 205 and 206, and therefore the second pair of actuators 205 and 206 can be non-resonant-driven. Thereby, the second pair of actuators 205 and 206 can rotate the mirror 202 with reference to the second central axis X2 via the movable frame 212, and the mirror 202 can scan the laser beam Ray emitted from the light source 12 in the two dimensional directions toward the wavelength converting member 18, which are substantially perpendicular to each other by associating the second pair of actuators 205 and 206 with the first pair of actuators 203 and 204 as described above.

Figure 9A:
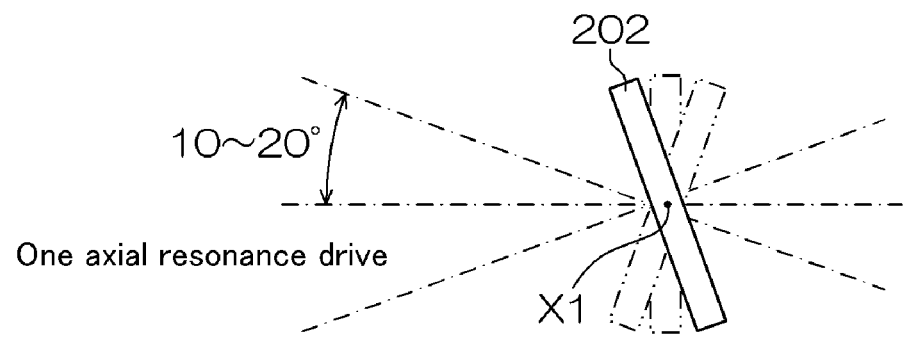
FIGS. 9a and 9b are an enlarged top view and an enlarged side view showing movements of a mirror of the optical deflector shown in FIG. 3 in a horizontal direction and in a vertical direction, respectively.
Figure 9B:
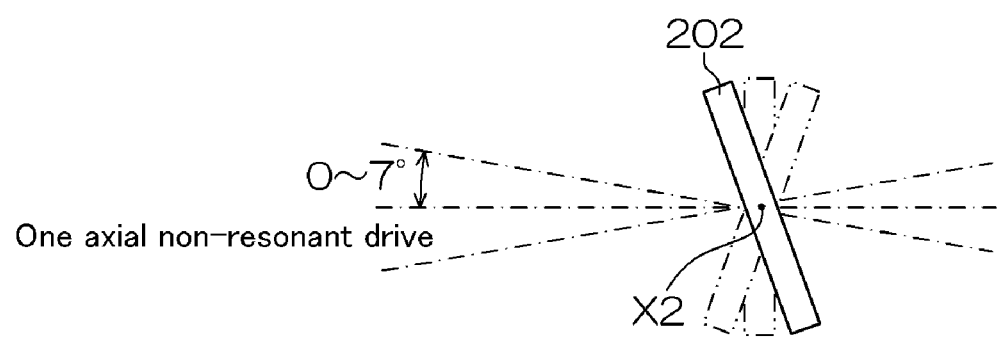

In the first embodiment of the optical deflector 201 of one axial resonance-one axial non-resonant driving type, the first central axis X1 can be located in a substantially vertical direction of a road and the second central axis X2 can be located in a substantially horizontal direction of the road in the vehicle headlight 10 shown in FIG. 1. The vehicle headlight 10 can form various favorable light-distribution patterns having a wide scope in the horizontal direction and a fine narrow scope in the vertical direction. FIGS. 9a and 9b are enlarged top view and side view showing movements of the mirror 202 in the horizontal direction and in vertical direction, respectively.

With respect to the optical deflector 201 of one axial resonance-one axial non-resonant driving type, a maximum rotatable angle of the mirror 202 with reference to the first central axis X1 can become larger than that of the mirror 202 with reference to the second central axis X2. When the mirror 202 is rotated by the first pair of actuator 203 and 204 via the pair of torsion bas 211a and 211b, each of the first pair of actuators 203 and 204 can be resonant-driven by the first AC voltage having a frequency and the second AC voltage having a reverse phase of the frequency of the first AC voltage, which is the substantially resonance frequency of the mirror 202 including the first pair of actuators 203 and 204, respectively. Accordingly, the maximum rotatable angle of the mirror 202 can be configured to set up 10 to 20 degrees at one side with reference to the first central axis X1, as shown in FIG. 9a.

With the maximum rotatable angle of the mirror 202 with reference to the second central axis X2, the second pair of actuators 205 and 206 can rotate the mirror 202 via the movable frame 212 with each of the third AC voltage having a frequency and the third AC voltage having a reverse phase of the frequency, which is provided between the odd electrodes of the piezoelectric cantilevers 205A, 205C, 206E, 206A, 206C and 206E and between the even electrodes of the piezoelectric cantilevers 205B, 205D, 206D, 206B, 206D and 206F, respectively. In this case, the maximum rotatable angle of the mirror 202 can be configured to set up 0 to 7 degrees at one side with reference to the second central axis X2, as shown in FIG. 9b.

Therefore, the mirror 202 can scan the laser beam Ray emitted from the light source 12 toward the wavelength converting material 18 in the two dimensional directions, which intersect at a substantially right angle with respect to each other, and various color lights can be emitted from the wavelength converting material 18 to provide light distribution patterns having the various color lights. The above-described vehicle headlight 10 can also provide drivers with various light distribution patterns having a substantially white color tone, which are a wide scope in the horizontal direction and a fine narrow scope in the vertical direction by using the optical deflector 201 of one axial resonance-one axial non-resonant driving type described above, in accordance with road conditions.

Next, each of the exemplary frequencies of the first/second AC voltage and the third AC voltage will now be described. A horizontal scanning frequency FH of the first/second AC voltage, which is applied to each of the first pair of actuators 203 and 204, can be approximately 4 KHz to 30 KHz, when the horizontal scanning frequency FH is a sine wave of a symmetric wave, which is well-known as a general AC voltage. The horizontal scanning frequency FH of the first/second AC voltage can be 27 KHz to 3 KHz. When the horizontal scanning frequency FH is used as a scanning beam for a high beam light distribution pattern of the vehicle headlight 10, the frequency FH can turn on/off every 0.1 degrees or less from 15 degrees in a rightward direction to 15 degrees in a leftward direction with reference to the vertical axis. Accordingly, a graphic mode of the horizontal light distribution pattern of the vehicle headlight 10 can be 300 or more.

In the optical deflector 201 of one axial resonance-one axial non-resonant driving type, when a vertical scanning frequency FV of the third AC voltage is a saw-tooth wave or a non-symmetric wave, which is almost never used as an AC wave, the vertical scanning frequency FV of the third AC voltage, which is applied to the second pair of actuators 205 and 206, can be approximately 55 Hz to 120 Hz. The vertical scanning frequency FV of the third AC voltage can be 55 Hz to 100 Hz and possibly, the vertical scanning frequency FV can be between 60 Hz to 80 Hz having a saw-tooth wave.

When a general running speed of a vehicle, for example, 0 to 150 kilometers per hour are considered, it can be determined that the vertical scanning frequency FV of the third AC voltage, which is applied to the second pair of actuators 205 and 206, is 50 Hz having a saw-tooth wave or more. The vertical scanning frequency FV of the third AC voltage can be 50 Hz to 100 Hz and possibly, the vertical scanning frequency FV can be between 50 Hz to 80 Hz having a saw-tooth wave. When the vertical scanning frequency FV is 70 Hz, a frame rate can be 70 frames per second because the frame rate depends on the vertical scanning frequency FV.

When a light distribution pattern is projected on a virtual vertical screen by the optical deflector 201 including the vertical scanning frequency FV of 55 Hz or more, the light distribution pattern can be formed as a dynamic picture image having a frame rate of 55 frames per second or more on the virtual screen. Similarly, when the vertical scanning frequency FV of the third AC voltage is 50 Hz to 100 Hz, the light distribution pattern can be formed as a dynamic picture image having a frame rate of 50 to 100 frames per second or more on the virtual screen. When the vertical scanning frequency FV are 50 Hz to 80 Hz, 70 Hz and the like, the light distribution pattern can be formed as a dynamic picture image having a same frame rate as described above on the virtual screen.

A resolution (the number of vertical scanning lines) in the vertical direction is as follows. The resolution=2 xa utility time coefficient of the vertical scanning KV×FH/FV When the horizontal scanning frequency FH is 25 KHz and the vertical scanning frequency FV is 70 Hz and when the utility time coefficient of the vertical scanning KV is 0.9 to 0.8, the resolution (the number of vertical scanning lines) in the vertical direction may become approximately 600.

As described above, the vertical scanning frequency FV of the third AC voltage having a saw-tooth wave, which is applied to the second pair of actuators 205 and 206, can be a extremely low frequency such that conventional vehicle lamps such as a headlight and the like have absolutely not used a range of frequency because conventional technical knowledge have been using a driving frequency of 220 Hz or more to prevent the vehicle lamps from flickers of light. Even in a general lighting field other than the vehicle lamps, it has been a technical knowledge to employ a driving frequency of 100 Hz or more to prevent general lightings from flickers of light.

For example, according to a Japanese ministerial ordinance for prescribing a technical standard of electrical appliances (the ministerial ordinance of Ministry of International Trade and Industry No. 85, 1962), "Do not feel a flicker of light emitted" is described, and also "it is defined as no-flicker light that no-gap-light is driven by an AC voltage having a frequency of 100 Hz or more, or light is driven by an AC voltage having a frequency of 500 Hz or more" is described. This Japanese ministerial ordinance does not cover vehicle lamps such as a headlight, etc. In general fluorescent lamps such as a household fluorescent, when the general fluorescent lamps are emitted by an AC voltage having a frequency of 50 to 60 Hz, it is well known that an interval of blinking for avoiding the flicker of light is 100 Hz to 120 Hz.

Next, the conventional technical knowledge, in which a frequency for avoiding the flicker of light is 220 Hz or more, or a frame rate for avoiding the flicker of light is 220 frames per second or more, will now be described using reference examples. In metal halide lamps (high intensity discharge lamp is called as HID lamp) used as a light source for vehicle headlights, the HID lamps have typically been driven by an AC voltage having a frequency of 350 to 500 Hz. When the HID lamps are driven by an AC voltage having a frequency of 800 Hz, drivers may hear noises of oscillation spectrum. When the HID lamps are driven by an AC voltage having a low frequency, a light-emitting efficiency of the HID lamps may decrease, and especially when the HID lamps are driven by an AC voltage having a frequency of 150 Hz or less, a life of the HID lamps may shorten due to a heating friction of electrodes of the HID lamps. Accordingly, the HID lamps have typically been driven by an AC voltage having a frequency of 350 to 500 Hz. In addition, according to Non-Patent Document No. 1 (ISAL 2013 Page 340 to 347: Glare-free High Beam with Beam-scanning), it is recommended that a beam-scanning frequency is 220 Hz or more, or 300 to 500 Hz or more. Similarly, according to Non-Patent Document No. 2 (ISAL 2013 Page 262 to 266: Flickering effects of vehicle exterior light systems and consequences), "a driving frequency for emitting vehicle lamps such as a headlight is approximately 400 Hz" is described.

As described above, it has absolutely not been known that the flickers of light can be prevented when the vehicle lamps such as the headlight are driven by the AC voltage having a low frequency such as 50 Hz to 100 Hz. Evaluating results will now be described with reference to FIG. 10 and FIG. 11, especially with respect to particular vertical scanning frequencies FV. An evaluating system shown in FIG. 10 includes a virtual road using a rotatable belt B, which may vary a rotating speed and in which a white line is depicted on the rotatable belt B to simulate an actual road. A scale of the virtual road is approximately one-fifth of the general actual road.

Figure 10:
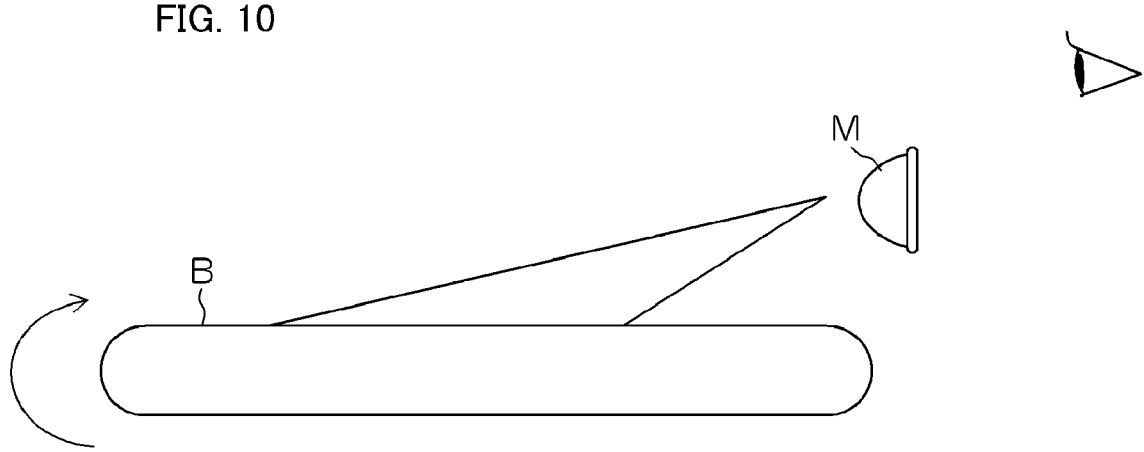
FIG. 10 is a schematic side view showing an evaluating system for evaluating driving frequencies of the vehicle headlight including the optical deflector apparatus shown in FIG. 1.

As a lighting model M, a lighting unit of the vehicle headlight shown in FIG. 10 is used so as to be able to scan the laser beam Ray emitted from the light source 12. First, the vertical scanning frequency FV when the light model M using an LED laser as a light source 12 emits the laser beam Ray on the rotatable belt B, was compared with the vertical scanning frequency FV when the light model M using an laser diode as a light source 12 emits the laser beam Ray on the rotatable belt B. Because their vertical scanning frequencies FV corresponded to each other, a difference between the light models M using the LED laser and the laser diode could not be confirmed. Accordingly, there may not be a difference of the flickers of light between the light models M using the LED laser and the laser diode.

Then, the vertical scanning frequencies FV, which were not felt as the flickers of light by observers, were measured while the speed of the rotatable belt B vary at 0 Km/h, 50 Km/h, 150 Km/h and 200 Km/h. Specifically, while the observers vary the vertical frequencies FV with a dial, they stop the dial when they did not feel the flickers of light, and the vertical frequencies FV when stopping the dial, were measured. These measurements were carried out under a lighting intensity 60 1x, which is similar to a light intensity on the actual road located approximately 30 to 40 meters away in a forward direction from vehicles, under a lighting intensity 300 1x, which is similar to a light intensity on the actual road located approximately 10 meters away in the forward direction from the vehicles, and under a lighting intensity 2,000 1x, which is similar to a light intensity of light emitted by an oncoming vehicle approaching the vehicles and to a light intensity of light reflected by a guard rail.

Figure 11:
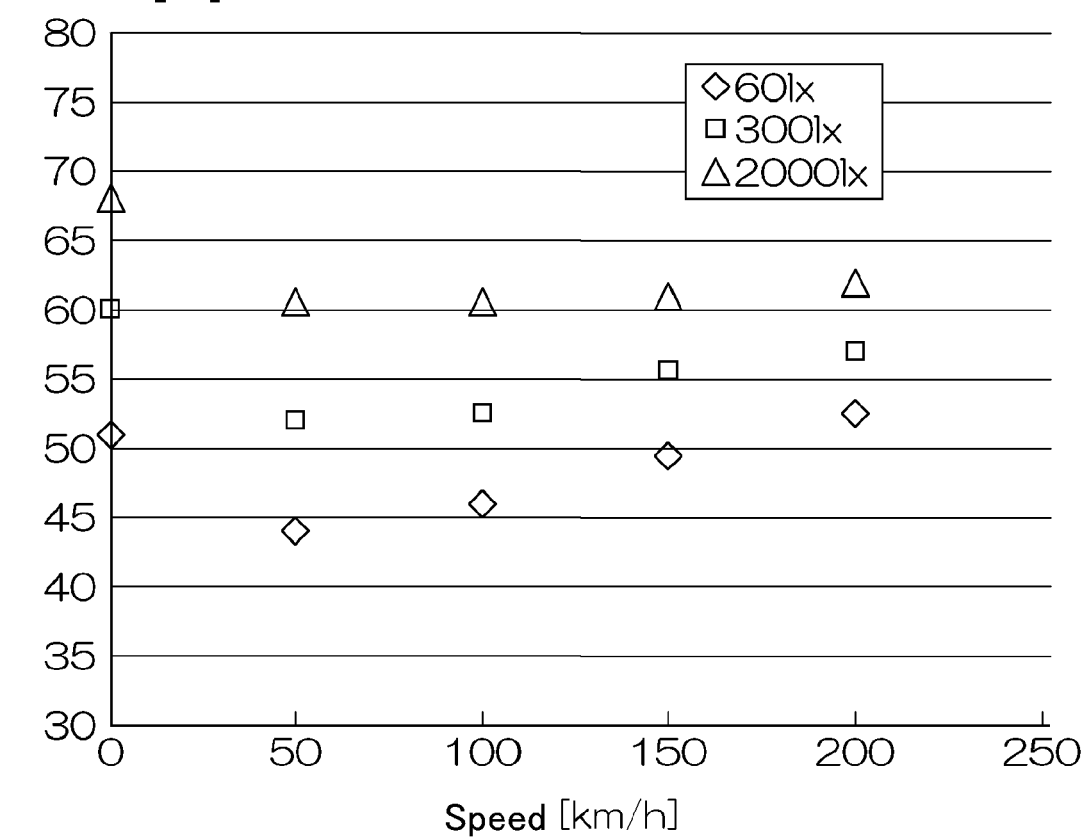
FIG. 11 is a table depicting evaluation results measured using the evaluating system shown in FIG. 10.

FIG. 11 is a table depicting evaluation results measured using the evaluating system as described above. According to the evaluation results shown in FIG. 11, the vertical scanning frequency FV, which is not felt as the flickers of light by the observers, is approximately 60 Hz or more under the light intensity 60 1x on the road at a vehicle speed of 0 Km/h to 200 Km/h. When considering the light intensity 60 1x on the road where drivers may behold on the actual road, it may be helpful to set up the vertical scanning frequency at 55 Hz or more when preventing the vehicle lamps such as the headlight from the flicker of light.

In addition, the vertical scanning frequency FV, which is not felt as the flickers of light by the observers, is 55 Hz or more under the light intensity 60 1x on the road at a general vehicle speed of 0 Km/h to 150 Km/h. When considering that the light intensity on the road where the drivers may behold most on the actual road is approximately 60 1x, it may be helpful to set up the vertical scanning frequency at 55 Hz or more to avoid the vehicle lams such as the headlight from the flickers of light. When the vehicle speed increases, the vertical scanning frequency FV, which is not felt as the flickers of light by the observers, also tends to increase. Accordingly, because it may be helpful to increase the vertical scanning frequency FV as the vehicle speed increases, the vertical scanning frequency FV can increase as the vehicle speed increase.

Moreover, when the light intensity on the road increases, the vertical scanning frequency FV, which is not felt as the flickers of light by the observers, tends to decrease. In view of this trend, it may be helpful to decrease the vertical scanning frequency FV as the light intensity on the road increases. As compared with vehicles, which move at 50 Km/h to 150 Km/h, the vertical scanning frequency FV, which is not felt as the flickers of light by the observers when the vehicles stop, tend to increase. In view of this characteristic, it may be helpful to vary the vertical scanning frequency FV in accordance with the speed of vehicles to avoid the flickers of light. For example, when a vertical scanning frequency when the vehicles stop is defined as FV1 and when a vertical scanning frequency when the vehicles drive is defined as FV2, the vertical scanning frequency FV1 at a stop can be larger than the vertical scanning frequency FV2 in driving.

Furthermore, according to the evaluation results shown in FIG. 11, when the speed of the vehicles is 0 Km/h to 200 Km/h under the light intensity of 60 1x, 300 1x and 2,000 1x, the vertical scanning frequency FV, which is not felt as the flickers of light by the observers, cannot exceed 70 Hz. Accordingly, the vertical scanning frequency FV can set up 40 Hz to 70 Hz to prevent the vehicle lams such as the headlight from the flickers of light. When the first pair of actuators 203 and 204 are resonant-driven with reference to the first central axis X1 by the AC voltage having a substantially resonance frequency of the mirror 202 including the first pair of actuators 203 and 204, the third AC voltage having the vertical scanning frequency FV, which is applied to the second pair of actuators 205 and 206, can be 120 Hz having the saw-tooth wave or less. The third AC voltage can have the vertical scanning frequency FV that can also be 100 Hz and have the saw-tooth wave or less. Said reasons will now be described with reference to FIG. 12.

Figure 12:
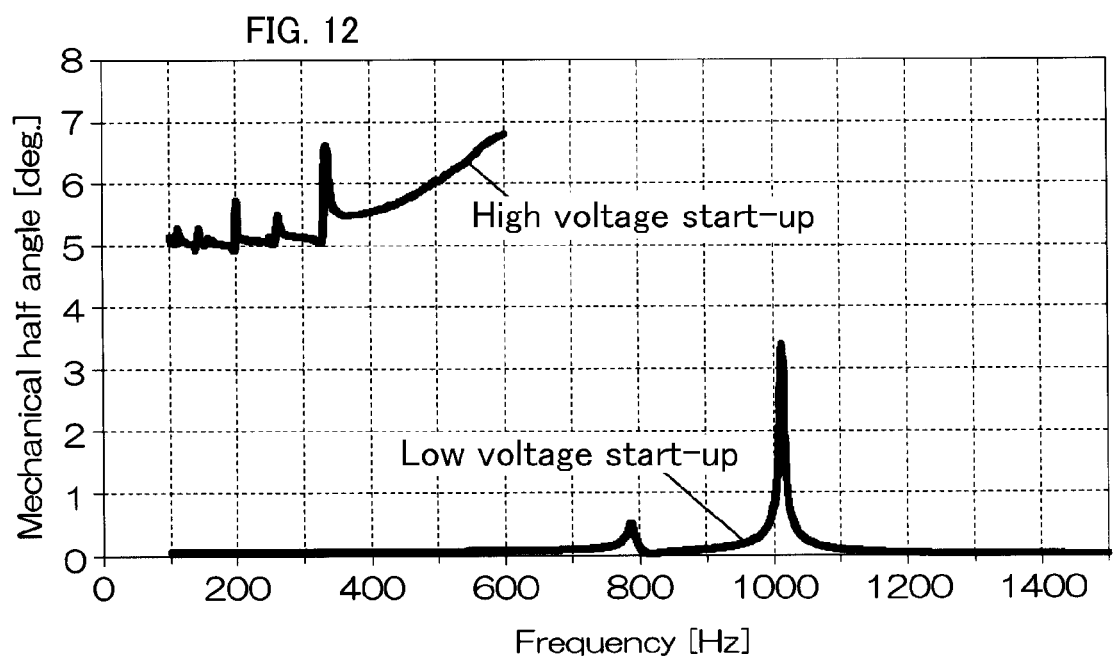
FIG. 12 is a chart showing a relation between vertical scanning frequencies for driving the second pair of actuators and rotating angles of the mirror.

FIG. 12 is a chart showing a relation between the vertical scanning frequencies FV (e.g., sine wave or triangular wave of symmetric waves) for driving the second pair of actuators 205 and 206 and rotating angles of the mirror 202 with reference to the second central axis X2. When the AC voltage of approximately 2 voltages is applied to the second pair of actuators 205 and 206 on a low voltage start-up time, a resonance frequency with respect to the vertical scanning frequency FV may be approximately 1,000 Hz and 800 Hz as shown in FIG. 12. On the other hands, when the AC voltage of approximately 45 voltages is applied to the second pair of actuators 205 and 206 on a high voltage start-up time, the resonance frequency with respect to the vertical scanning frequency FV may become approximately 350 Hz and 200 Hz at maximum mechanical half angles.

In order to provide the mirror 202 with a stable angle control using a cyclic oscillation, the vertical scanning frequency FV needs to be displaced from the resonance frequency with respect to the vertical scanning frequency FV. Therefore, the vertical scanning frequency FV (frequency of the third AC voltage), which is applied to the second pair of actuators 205 and 206, can set up 120 Hz having the saw-tooth wave of the non-symmetric wave or less. The vertical scanning frequency FV can be 100 Hz having the saw-tooth wave or less.

When the vertical scanning frequency FV of the third AC voltage, which is applied to the second pair of actuators 205 and 206, exceeds 120 Hz, reliability, durability, a life and the like may degrade. Hence, the vertical scanning frequency FV, which is applied to the second pair of actuators 205 and 206, can be 120 Hz having the saw-tooth wave or less, and possibly, the vertical scanning frequency FV of third AC voltage can be 100 Hz having the saw-tooth wave or less. Therefore, the disclosed subject matter can provide optical deflector apparatuses having a high reliability and a long life, which can emit scanned beams having various color tones including the while color tone by associating the wavelength converting member 18 with the light source 12 so as to be able to be used for a stage lighting, a room lighting for warming up events and the like in addition to the vehicle lamps such as the headlight.

A control system to control the light source 16 and the optical deflector 201 will now be described with reference to FIG. 13. The control system can include: a light source driver 28 driving the light source 12; a mirror driver 26 driving a mirror device 16 including the mirror 202, and rotating the mirror 202 with reference to the first and second central axis X1 and X2 in the two dimensional directions perpendicular to each other; a camera 30 photographing road conditions such as incoming vehicles, forward vehicles of an subject vehicle incorporating the control system and the like; a light intensity sensor 32 detecting a light intensity in a forward direction of the subject vehicle; a speed sensor 34 detecting a speed of the subject vehicle; an incline sensor 36 detecting a incline of the subject vehicle with reference to a driving road; a distance sensor 38 detecting a distance between the subject vehicle and a light-projecting point emitted from the light source 12; a brake/accelerator sensor 40 detecting an operation of brake/accelerator; a controller 24 controlling the above described drivers 26 and 28 and the above-described sensors 30, 32, 34, 36, 38 and 40; and a memory 44 storing various data, which are output from the controller 24 and are input to the controller 24.

The mirror driver 26 can provide each of the first pair of actuators 203 and 204 with the first AC voltage having a frequency and the second AC voltage having a reverse phase of the frequency of the first AC voltage (e.g., sine wave having a frequency of 24 KHz), respectively, and thereby can rotate the mirror 202 with reference to the first central axis X1 via the pair of torsion bars 211a and 211b by resonance-driving the first pair of actuators 203 and 204 using the mirror driver 26 in accordance with instructions output from the controller 24. The mirror drive 26 can also apply each of the third AC voltage having a frequency and a reverse phase of the frequency (e.g., saw-tooth wave having a frequency of 60 Hz) to the second pair of actuators 205 and 206, respectively, and thereby can rotate the mirror 202 with reference to the second central axis X2 via the movable frame 212 by non-resonance-driving the second pair of actuators 205 and 206 in accordance with instructions output from the controller 24.

In this case, FIG. 14a shows an exemplary modulation wave of the light source 12, which is modulated by a modulation frequency FL of the above-described frequency 24 KHz of the first and second AC voltages synchronizing with the rotation of the mirror 202. The exemplary sine wave having the resonance frequency of 24 KHz of the first AC voltage, which is applied to the first actuator 203 by the mirror driver 26, is shown by FIG. 14b. FIG. 14c shows the exemplary non-resonance saw-tooth wave having the frequency of 60 Hz of the non-symmetric wave, which is applied to the second actuator 205.

FIG. 15a are charts showing an exemplary mirror intergradations, an exemplary mirror speed and an exemplary output of the light source 18 when each of the exemplary first and second AC voltage (e.g., resonance sine wave having a frequency of 24 KHz) is applied to the first pair of actuators 203 and 204, respectively, and FIG. 15b are charts showing an exemplary mirror intergradations, an exemplary mirror speed, an exemplary output of the light source and the exemplary output in detail when each of the exemplary third AC voltage having the frequency and the reverse phase of the frequency (e.g., saw-tooth wave having the frequency of 60 Hz) is applied to the second pair of actuators, respectively.

The light source driver 28 can modulate the laser beam Ray emitted from the light source 12 while synchronizing with the rotating movement of the mirror 202 in accordance with the instructions output from the controller 24. A modulation frequency FL of the laser beam Ray is calculated by the following formula. The modulation frequency FL=(the number of pixels)×(Frame rate: FV)/(Blanking time ratio: BR). Accordingly, when the number of pixels is 300×600, Frame rate FV is 70 and Blanking time ratio BR is 0.5, the modulation frequency FL is approximately 24 KHz. In this case, an output on/off of the light source 12 and/or the light intensity of the output of the light source 12 can be controlled every 1 per 24 KHz (second).

The light source driver 28 can modulate the laser beam Ray emitted from the light source 12 in accordance with light distribution pattern data stored at the memory 44 so that the optical deflector 201 can form various light distribution patterns via the wavelength converting member 18 and the projector lens 20 using the laser beam Ray, which is scanned in the two dimensional directions of the horizontal and vertical direction by the optical deflector 201. The various light distribution patterns can include a high beam light distribution pattern, a low beam light distribution pattern, driving light distribution patterns for high ways, driving light distribution patterns for urban areas, etc.

The light distribution pattern data stored at the memory 44 can include each data of outline forms of the above-described light distribution patterns and each data of light intensity distributions of the above-described light distribution patterns. Consequently, when the optical deflector 201 forms the various light distribution patterns via the wavelength converting member 18 and the projector lens 20 using the laser beam Ray, which is scanned in the two dimensional directions of the horizontal and vertical direction by the optical deflector 201, the various light distribution patterns can be projected in a moving direction of the subject vehicle in accordance with each of the outline forms and each of the light intensity distributions thereof in an appropriate manner.

In this case, as exemplary lighting methods in the horizontal direction using the laser beam Ray emitted from the light source 12, a lighting method in both of rightward/leftward directions of the horizontal scanning line can be employed as shown in FIG. 16a, and also a lighting method in one of leftward direction of the horizontal direction can be employed as shown in FIG. 16b. An interlace lighting method in the one of leftward direction of the horizontal direction by interlacing two lines of A-scanning line and B-scanning line can also be used as shown in FIG. 16c.

Figure 17A:
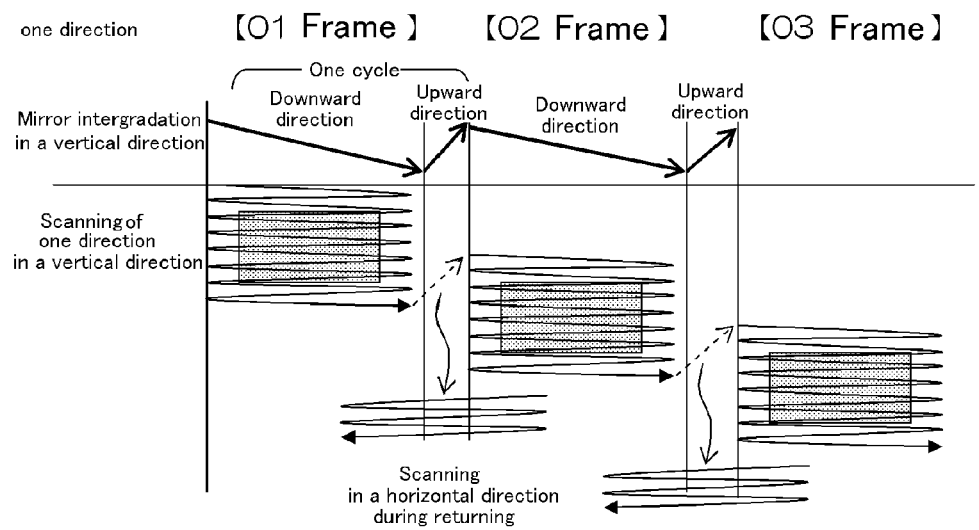
FIGS. 17a and 17b are explanatory charts depicting each of exemplary lighting methods of one direction and both directions in the vertical direction using the laser beam emitted from the light source, respectively.

In addition, with respect to exemplary scanning methods in the vertical direction while associating with the lighting method of the horizontal direction using the laser beam Ray emitted from the light source 12, an exemplary scanning method of one direction can be used as shown in FIG. 17a. This method is that when a lighting point of the laser beam Ray reached from a starting point of a top end of the horizontal scanning direction to a finishing point of a bottom end of the horizontal scanning direction, the lighting point located at the finishing point returns to the starting point and repeats the above-described operation.

Figure 17B:
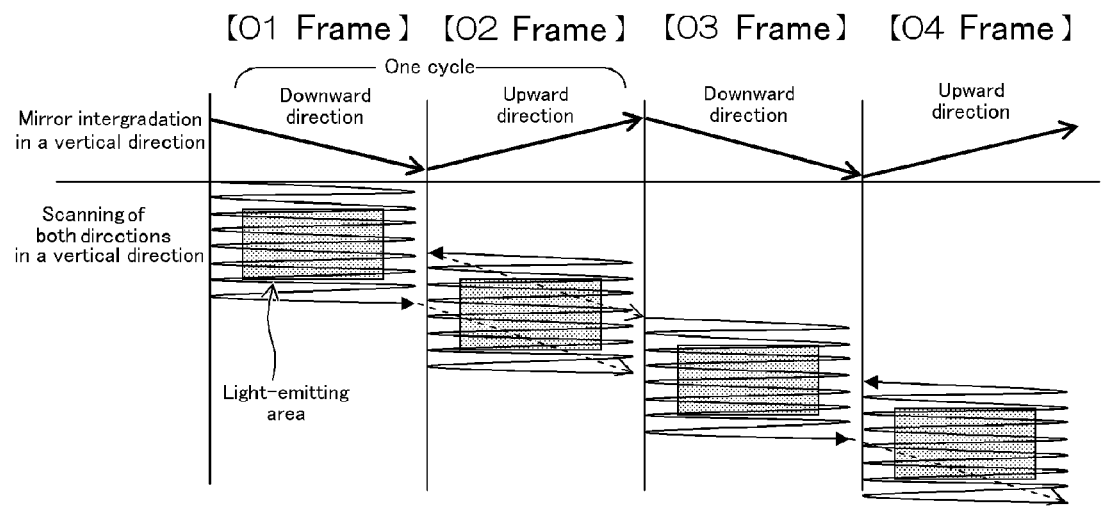

An exemplary scanning method of both directions, in which when the lighting point of the laser beam Ray reached from the starting point of the top end of the horizontal scanning direction to the finishing point of the bottom end of the horizontal scanning direction, the lighting point returns from the finishing point to the starting point and repeats operations of the above-described downward/upward direction, can also be used as shown in FIG. 17b.

Figure 13:
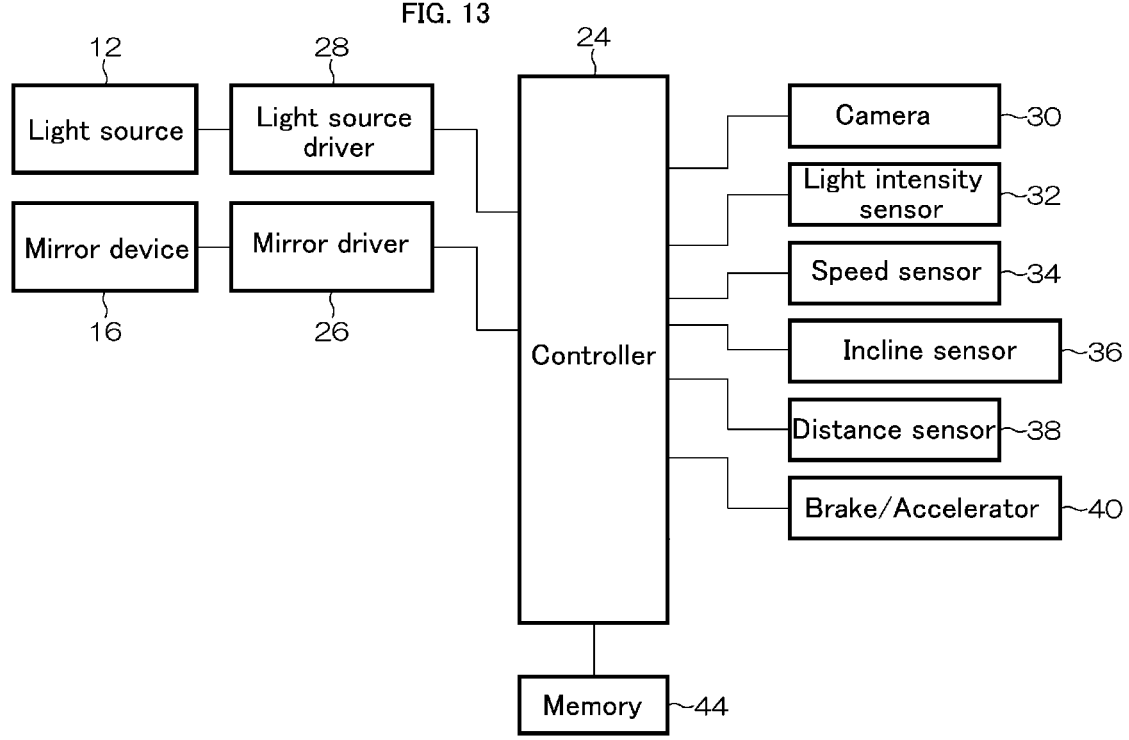
FIG. 13 is a block diagram showing a control system to control a light source and the optical deflector of the vehicle headlight shown in FIG. 1.

The light intensity sensor 32 can detect the light intensity in the forward direction of the subject vehicle incorporating the control system shown in FIG. 13. When the light intensity on the road increases, the vertical scanning frequency FV, which is not felt as the flickers of light by the observers, tends to increase as described above with reference to FIG. 11. Accordingly, the vertical scanning frequency FV can vary in accordance with light intensity data output from the light intensity sensor 32.

For example, a prepared table, in which a plurality of vertical scanning frequencies FV corresponds to each of various light intensities on the road, can be preliminarily stored at the memory 44 of the control system. When the light intensity vary on the road, the controller 24 can enable the mirror driver 26 to drive the second pair of actuators 205 and 206 by using the third AC voltage having a non-resonance vertical scanning frequency FV in accordance with the prepared table in the memory 44 with reference to the light intensity data output from the light intensity sensor 32.

The speed sensor 34 can detect a speed of the subject vehicle, and when the subject vehicle has the speed sensor, the controller 24 can also receive a speed signal of the subject vehicle as the speed sensor thereof. When the vehicle speed increases, the vertical scanning frequency FV, which is not felt as the flickers of light by the observers, tends to increase. Therefore, the vertical scanning frequency FV can vary in accordance with the speed signal data of the subject vehicle output from the speed sensor 34.

For example, the control system can increase the vertical scanning frequency FV as the vehicle speed increases. Specifically, a prepared table, in which a plurality of vertical scanning frequencies FV corresponds to each of various speeds of the subject vehicle moving on the road, can be preliminarily stored at the memory 44 of the control system. As the vehicle speed varies, the controller 24 can enable the mirror driver 26 to drive the second pair of actuators 205 and 206 by using the third AC voltage having a non-resonance vertical scanning frequency FV in accordance with the prepared table in the memory 44 with reference to the speed signal output from the speed sensor 34 or output from the subject vehicle.

In addition, as compared with vehicles, which move at 50 Km/h to 150 Km/h, the vertical scanning frequency FV, which is not felt as the flickers of light by the observers when the vehicles stop, tends to increase. Accordingly, the vertical scanning frequency FV can increase when the vehicles stop as compared with vehicles moving at 50 Km/h to 150 Km/h. In this case, a vehicle scanning frequency at a stop FV1 and a vehicle scanning frequency at moving FV2 can be stored at the memory 44 in advance. The controller 24 can enable the mirror driver 26 to drive the second pair of actuators 205 and 206 by using the third AC voltage having the non-resonance vertical scanning frequency at a stop FV1, when the controller 24 judges that the subject vehicle stops in accordance with the speed signal output from the speed sensor 34 or output from the subject vehicle. When the controller 24 judges that the subject vehicle moves, the controller 24 can also enable the mirror driver 26 to drive the second pair of actuators 205 and 206 by using the third AC voltage having the non-resonance vertical scanning frequency at moving FV2.

The camera 30 can photograph road conditions such as incoming vehicles, forward vehicles of the subject vehicle, etc. Accordingly, the vehicle headlight 10 including the above-described control system can be used as an Adaptive Driving Beam (ADB), which can vary a light distribution pattern. For example, when the camera 30 detects that vehicles do not exist in a forward direction of the subject vehicle, the vehicle headlight 10 can provide an elbow light distribution pattern and the common light distribution pattern CLDP at once as a low beam light distribution pattern to improve a view in the forward direction of the subject vehicle while preventing an emission of a glare type light toward oncoming vehicles as shown in FIG. 25.

When the camera 30 detects that vehicles do not also exist on an oncoming lane as well as a driving lane in the forward direction of the subject vehicle, the vehicle headlight 10 can provide a high beam distribution pattern HBDP including the above low beam pattern to further improve the view in the forward direction of the subject vehicle. When the subject vehicle turns right or left, the vehicle headlight 10 can also provide a right side distribution pattern RSDP or a left side distribution pattern LSDP to improve a view of corner in a rightward or leftward direction of the subject vehicle, respectively. When a driver of the subject vehicle drives under a rainy weather, the vehicle headlight 10 can emit an under light distribution pattern ULDP for the driver to improve a view of near portion in the forward direction of the subject vehicle while preventing repelling water toward pedestrians as shown in FIG. 25.

In these cases, when the camera 30 detects a pedestrian, the vehicle headlight 10 can decrease a light-emitting intensity on a region, where the pedestrian exists, and also can quench light on the region. When the incline sensor 36 can detect an upward tendency of the subject vehicle with reference to a road because the subject vehicle lades a heavy suitcase and the like in a trunk, the above-described light distribution patterns may also be subject to an upward tendency. Hence, the vehicle headlight 10 can revise the light distribution patterns so as to prevent an emission of a glare type light toward oncoming vehicles and forward vehicles driving on a same lane as the subject vehicle.

In addition, the vehicle headlight 10 can also revise the light distribution patterns and/or a light-emitting intensity of the light distribution patterns so as to prevent an emission of a glare type light toward oncoming vehicles and forward vehicles driving on a same lane as the subject vehicle using distance data output from the distance sensor 38 in accordance with each of distances between the above-described vehicles and the subject vehicle. A senor and apparatus for vehicle height measurement disclosed in Patent Document No. 8 can be used as the incline sensor 36. As the distance sensor 38 and a circling detector for detecting whether the subject vehicle turns right or left, a circling detector (14) and a distance detector (17) of "headlight control, optical unit and vehicle headlight" disclosed in Patent Document No. 9 can be employed. Numbers (14) (17) shown in parentheses are used in Patent Document No. 9 as marks.

A second exemplary embodiment of the optical deflector will now be described with reference to FIG. 18. The optical deflector 161 can include: a mirror 162 having a first central axis X3, a second central axis X4 and a pair of tips located on in substantially parallel with the first central axis X3, being symmetrical with respect to the substantially first central axis X3, and located at a middle portion of the optical deflector 161, and each of the first central axis X3 and the second central axis X4 intersecting at a right angle with respect to each other; a movable frame 171 having a first pair of inner surfaces 171a1 and 17a2, a second pair of inner surfaces 171b1 and 171b2 and a pair of outer surfaces 171c1 and 171c2 being formed in a substantially rectangular frame shape, each of the first pair of inner surfaces 171a1 and 17a2 and the second pair of inner surfaces 171b1 and 171b2 being located in a direction perpendicular to each other, each of the second pair of inner surfaces 171b1 and 171b2 located opposite a respective one of the pair of outer surfaces 171c1 and 171c2, respectively, the movable frame 171 surrounding the mirror 162 via a first space 162a and a second space 162b, and each of the pair of outer surface 171c1 and 171c2 being located opposite to each other; and an outer frame 173 having a top surface 173a and a pair of inner surfaces 173b1 and 173b2 also formed in a substantially rectangular frame shape, and surrounding the movable frame 171 via a third space 173c, and each of the pair of inner surfaces 173b1 and 173b2 being located opposite to each other.

In addition, the optical deflector 161 can also include a first pair of piezoelectric cantilever actuators 163 and 164 each having a movable end 163b and 164b and a fixed end 163a, 164a connected to a respective one of the inner surfaces 171a1 and 171a2 of the movable frame 171 that intersects with the second central axis X3 at a substantially right angle, respectively, and being possible to rotate the mirror 162 by forming the first space 162a between the mirror 162 and each of the first pair of piezoelectric cantilever actuators 163 and 164 and by forming the second space 162b between the first pair of piezoelectric cantilever actuators 163 and 164 and the second pair of inner surfaces 171b1 and 171b2 of the movable frame 162, the movable end 163b and 164b of each of the first pair of piezoelectric cantilever actuators 163 and 164 contacting a respective one of the pair of tips of the mirror 162, respectively, and being aligned with the pair of tips of the mirror 162.

Moreover, the optical deflector 161 can also include a second pair of piezoelectric cantilever actuators 165 and 166 each having a fixed end and a movable end, the movable end of each of the second pair of piezoelectric cantilever actuators 165 and 166 connecting a respective one end of the pair of outer surfaces 171c1 and 171c2 of the movable frame 171, respectively, the fixed ends of each of the second pair of piezoelectric cantilever actuators 165 and 166 connecting a respective one of the pair of inner surfaces 173b1 and 173b2 of the outer frame 173, each of the second pair of piezoelectric cantilever actuators 205 and 206 being located between the respective one of the pair of inner surfaces 173b1 and 173b2 of the outer frame 173 and a respective one of the pair of outer surfaces 171c1 and 171c2 of the movable frame 171 that faces the respective of the pair of inner surfaces 173b1 and 173b2 of the outer frame 173 via each of the second pair of piezoelectric cantilever actuators 205 and 206 in a longitudinal direction thereof.

Figure 18:
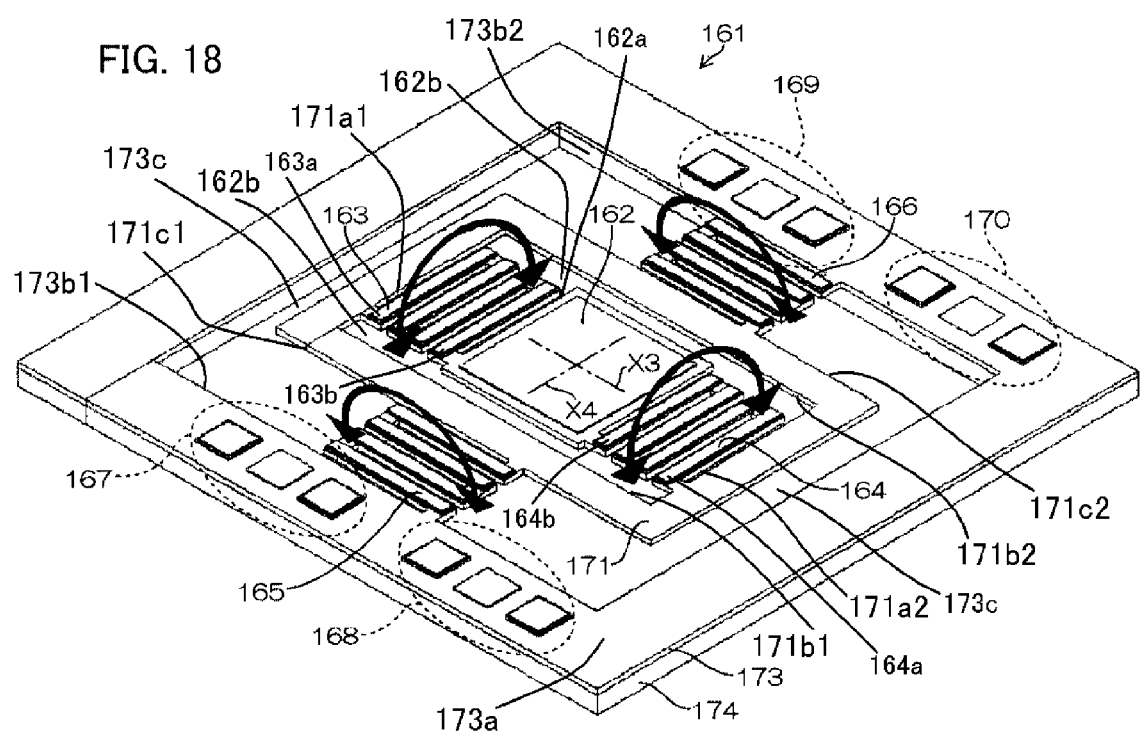
FIG. 18 is an enlarged perspective view depicting a second exemplary optical deflector of the optical deflector apparatuses shown in FIG. 1 and FIG. 2.

Furthermore, the optical deflector 161 can also include a first electrode group 167, a second electrode group 168, a third electrode group 169 and a fourth electrode group 170, which are formed on at least one of surfaces (e.g., top surface as shown in FIG. 18) of the outer frame 173, the first electrode group 167 being electrically connected to the first actuator 163, the second electrode group 168 being electrically connected to the second actuator 165, the third electrode group 169 being electrically connected to the second actuator 166 and the fourth electrode group 170 being electrically connected to the first actuator 164, and a base 174 attaching the outer frame 173.

In the second embodiment of the optical deflector 161 of two-axial non-resonant driving type, the first central axis X3 can be located in the substantially vertical direction of a road and the second central axis X4 can be located in the substantially horizontal direction of the road in the vehicle headlight 10 shown in FIG. 1. The vehicle headlight 10 including the optical deflector 161 can also form various favorable light-distribution patterns having the wide scope in the horizontal direction and the fine narrow scope in the vertical direction as described above.

In this case, each of the first pair of piezoelectric cantilever actuators 163 and 164 can be provided with a first AC voltage having a frequency and a reverse phase of the frequency, which is lower frequency than a mechanical resonant frequency of the mirror 162, respectively. Thereby, the mirror 162 can rotate with reference to the first central axis X3, and can scan the laser beam Ray in the substantially horizontal direction with respect to the road. Each of the second pair of piezoelectric cantilever actuators 165 and 166 can also be provided with a second AC voltage having a frequency and a reverse phase of the frequency, which is lower frequency than the mechanical resonant frequency of the mirror 162, respectively. Consequently, the mirror 162 can also rotate with reference to the first central axis X4 via the movable frame 171, and can scan the laser beam Ray in the substantially vertical direction with respect to the road.

Accordingly, the vehicle headlight 10 including the optical deflector 161 can also form various favorable light-distribution patterns having the wide scope in the horizontal direction and the fine narrow scope in the vertical direction by scanning the laser beam Ray toward the wavelength converting member 18 using the mirror 162 in the two dimensional directions of the horizontal and vertical direction as described with reference to FIG. 13 and FIG. 25.

FIG. 19a are charts showing an exemplary mirror intergradations, an exemplary mirror speed and an exemplary output of the light source when each of an exemplary first AC voltage having a positive phase and a reverse phase (e.g., Non-resonance saw-tooth wave having a frequency of 6 KHz) is applied to the first pair of actuators 163 and 164, respectively, and FIG. 19b are charts showing an exemplary mirror intergradations, an exemplary mirror speed, an exemplary output of the light source and the exemplary output in detail when each of an exemplary second AC voltage having a frequency and a reverse phase of the frequency (e.g., non-resonance saw-tooth wave having the frequency of 60 Hz) is applied to the second pair of actuators 165 and 166, respectively.

Therefore, the disclosed subject matter can provide optical deflector apparatuses having a high reliability and a long life, because at least the frequency of the second AC voltage can shorten as compared with conventional optical deflector, even when the optical deflector 161 of two-axial non-resonant driving type is used as a mirror for scanning the laser beam Ray. The vehicle headlight 10 including the optical deflector 161 having a high reliability and a long life can also emit scanned beams having various color tones including the while color tone by associating the wavelength converting member 18 with the light source 12 so as to be also able to be used for a stage lighting, a room lighting for warming up events, etc.

Figure 20:
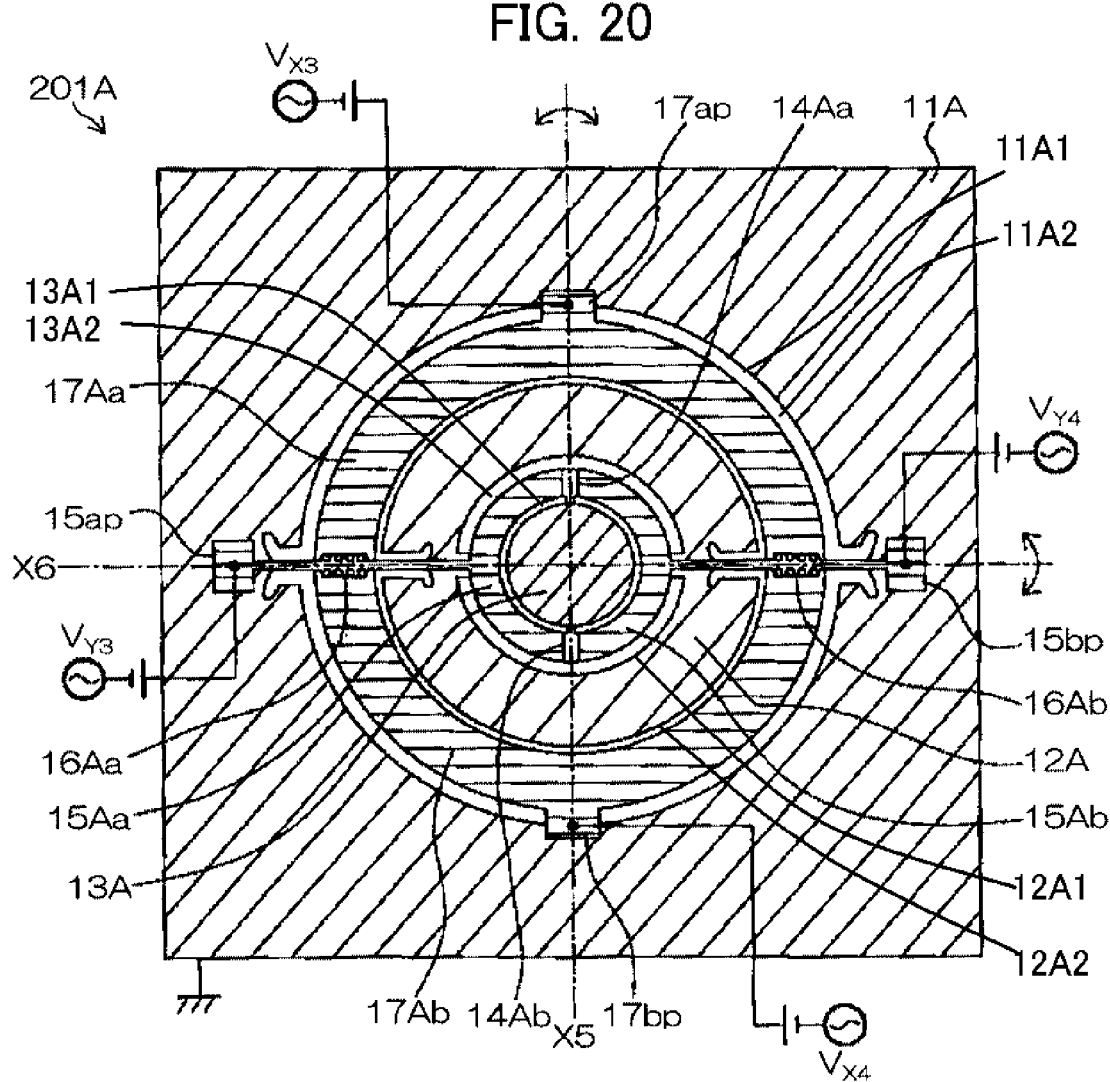
FIG. 20 is an enlarged top view depicting a third exemplary optical deflector of the optical deflector apparatuses shown in FIG. 1 and FIG. 2.

A third exemplary embodiment of the optical deflector will now be described with reference to FIG. 20, which an enlarged top view depicting the third exemplary optical deflector of the optical deflector apparatuses shown in FIG. 1 and FIG. 2. The optical deflector 201A can include: a mirror 13A having a first central axis X5, a second central axis X6 and a first pair of tips located on the substantially first central axis X5, being symmetrical with respect to the substantially first central axis X5, and located at a middle portion of the optical deflector 201A, and each of the first central axis X1 and the second central axis X2 intersecting at a right angle with respect to each other; a movable frame 12A having an inner surface 12A1 and an outer surfaces 12A2 being formed in a substantially torus shape, and the inner surface 12A1 thereof surrounding the mirror 13A via a first space 13A1 and a second space 13A2; an outer frame 11A having an inner surface 11A1 being formed in a substantially rectangular frame shape having a substantially circular opening, and surrounding the movable frame 12A via a third space 11A2; and a first pair of torsion bars 14Aa and 14Ab each connecting between a respective one of the pair of tips of the mirror 13A and a respective one middle portion of the inner surface 12A1 of the movable frame 12A, each of the respective one middle portion of the inner surface 12A1 of the movable frame 12A and the respective one of the pair of tips of the mirror 12A being located on the substantially first central axis X5, and the torsion bars 14Aa and 14Ab being elastic in a longitudinal direction.

In addition, the optical deflector 201A can also include a first pair of piezoelectric cantilever actuators 15Aa and 15Ab each having two movable ends and a fixed end connected to other respective one middle portion of the inner surfaces 12A1 of the movable frame 12A that intersects with the second central axis X6, and being possible to rotate the mirror 13A via the first pair of torsion bars 14Aa and 14Ab by forming the first space 13A1 between the mirror 13A and each of the first pair of piezoelectric cantilever actuators 15Aa and 15Ab formed in a semicircular arc shape and by forming the second space 13A2 between the first pair of piezoelectric cantilever actuators 15Aa and 15Ab and the inner surface 12A1 of the movable frame 13A, respective ones of the two movable ends of each of the first pair of piezoelectric cantilever actuators 15Aa and 15Ab contacting respective ones 14Aa, 14Ab of the pair of torsion bars 14Aa and 14Ab in the longitudinal directions of the respective ones 14Aa, 14Ab of the pair of torsion bars 14Aa and 14Ab, respectively.

Moreover, the optical deflector 201A can also include: a second pair of torsion bars 16Aa and 16Ab each connecting between other respective one middle portion of the inner surface 12A1 of the movable frame 12A, each of the other respective one middle portion of the inner surface 12A1 of the movable frame 12A and the second pair of torsion bars 16Aa and 16Ab being located on the substantially second central axis X6, and the torsion bars 16Aa and 16Ab being elastic in a longitudinal direction; and a second pair of piezoelectric cantilever actuators 17Aa and 17Ab each having two movable ends and a fixed end connected to a respective one middle portion of the inner surfaces 11A1 of the outer frame 11A that intersects with the first central axis X5, and being possible to rotate the mirror 13A via the second pair of torsion bars 15Aa and 16Ab and the movable frame 12A by forming a third space 11A2 between the inner surface of the outer frame 11A and each of the second pair of piezoelectric cantilever actuators 17Aa and 17Ab formed in a semicircular arc shape and by forming the second space 13A2 between the first pair of piezoelectric cantilever actuators 15Aa and 15Ab and the outer surface 12A2 of the movable frame 12A, respective ones of the two movable ends of each of the second pair of piezoelectric cantilever actuators 17Aa and 17Ab contacting respective ones 17Aa, 17Ab of the second pair of torsion bars 17Aa and 17Ab in the longitudinal directions of the respective ones 14Aa, 14Ab of the second pair of torsion bars 17Aa and 17Ab, respectively.

Furthermore, the optical deflector 201A can include a first electrode group 15ap to provide the first piezoelectric cantilever actuators 15Aa with an AC voltage supply Vy3, a second electrode group 15bp to provide the first piezoelectric cantilever actuators 15Ab with an AC voltage supply Vy4, a third electrode group 17ap to provide the second piezoelectric cantilever actuators 17Aa with an AC voltage supply Vx3 and a fourth electrode group 17bp to provide the second piezoelectric cantilever actuators 17Ab with an AC voltage supply Vx4.

In the third embodiment of the optical deflector 201 of two-axial resonant driving type, the first central axis X5 can be located in the substantially vertical direction of a road and the second central axis X6 can be located in the substantially horizontal direction of the road in the vehicle headlight 10 shown in FIG. 1. The vehicle headlight 10 including the optical deflector 201A can also form various favorable light-distribution patterns having the wide scope in the horizontal direction and the fine narrow scope in the vertical direction as described above.

In this case, each of the first pair of piezoelectric cantilever actuators 15Aa and 15Ab can be provided with a first AC voltage having a frequency and a reverse frequency of the frequency, which is a substantially same frequency as a mechanical resonant frequency of the mirror 13A including the first pair of piezoelectric cantilever actuators 15Aa and 15Ab, respectively. Thereby, the mirror 13A can rotate with reference to the first central axis X5, and can scan the laser beam Ray in the substantially horizontal direction with respect to the road. Each of the second pair of piezoelectric cantilever actuators 17Aa and 17Ab can also be provided with a second AC voltage having a frequency and a reverse frequency of the frequency, which is a substantially same frequency as a mechanical resonant frequency of the movable frame 12A including the second pair of piezoelectric cantilever actuators 16Aa and 16Ab, respectively. Hence, the mirror 13A can also rotate with reference to the second central axis X6 via the movable frame 12A, and can scan the laser beam Ray in the substantially vertical direction with respect to the road.

Accordingly, the vehicle headlight 10 including the optical deflector 201A can also form various favorable light-distribution patterns having the wide scope in the horizontal direction and the fine narrow scope in the vertical direction via the projector lens 20 by scanning the laser beam Ray toward the wavelength converting member 18 using the mirror 13A in the two dimensional directions of the horizontal and vertical direction as described with reference to FIG. 13 and FIG. 25.

FIG. 21a are charts showing an exemplary mirror intergradations, an exemplary mirror speed and an exemplary output of the light source when each of an exemplary first AC voltage having a frequency and a reverse phase of the frequency (e.g., resonance sine wave having a frequency of 24 KHz) is applied to the first pair of actuators 15Aa and 15Ab, respectively, and FIG. 21b are charts showing an exemplary mirror intergradations, an exemplary mirror speed, an exemplary output of the light source and the exemplary output in detail when each of an exemplary second AC voltage having a frequency and a reverse phase of the frequency (e.g., resonance sine wave having the frequency of 12 Hz) is applied to the second pair of actuators 165 and 166, respectively.

Consequently, the disclosed subject matter can provide the optical deflector apparatus 201A having a high reliability and a long life, which can be driven by an AC voltage having a lower frequency without a flicker of light, and which can scan various color lights including the white color tone by associating the wavelength converting member 18 with the light source 12. The vehicle headlight 10 including the optical deflector 201A having a high reliability and a long life can also emit scanned beams having various color tones including the white color tone to provide various light distribution patterns for the driver of the subject vehicle in accordance with the road conditions.

Figure 22:
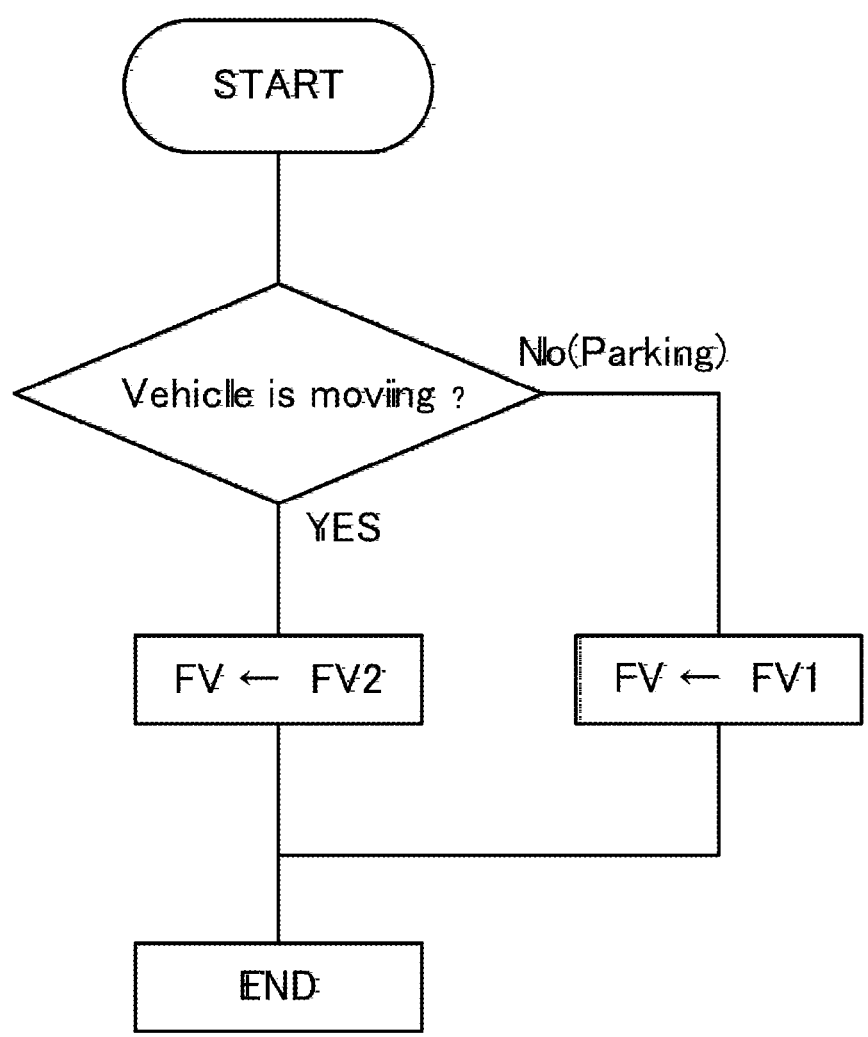
FIG. 22 is a flow chart depicting a first exemplary operation to improve a reliability, a life and the like in the exemplary embodiments of the optical deflector apparatus used for the vehicle headlight shown in FIG. 1.

FIG. 22 is a flow chart depicting a first exemplary operation to improve reliability, a life and the like in the exemplary embodiments of the optical deflector apparatus used for the vehicle headlight. When the vehicle headlight 10 including the optical deflector apparatus turns on, if the subject vehicle is parking, the vertical scanning frequency FV can be set up at the above described FV1 (e.g., 70 Hz) which is a comparatively high frequency in the disclosed subject matter. Then, when the subject vehicle moves, the vehicle headlight 10 can select a light distribution pattern in accordance with the road conditions by decreasing the vertical scanning frequency FV at the FV, which is lower frequency than the FV1. By employing the first exemplary operation described above, the vehicle headlight 10 using the optical deflector apparatus can improve a higher reliability and a longer life because the vertical scanning frequency reduces with frequency.

Figure 23:
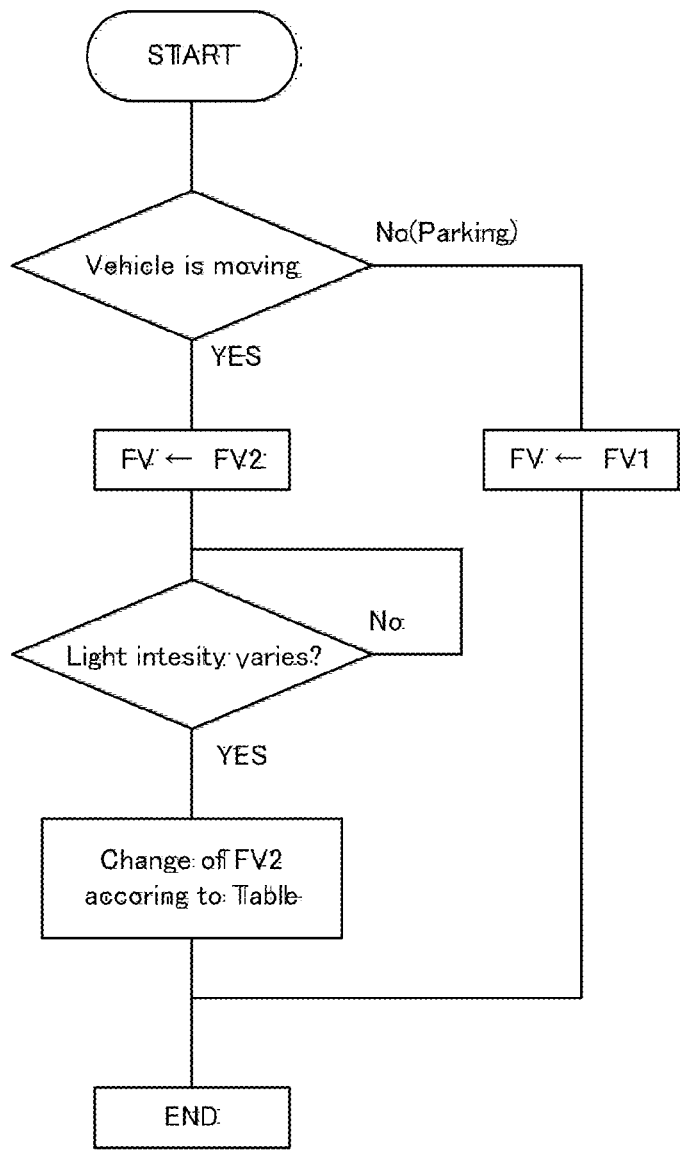
FIG. 23 is a flow chart depicting a second exemplary operation to improve a reliability, a life and the like in the exemplary embodiments of the optical deflector apparatus.
Figure 26A:
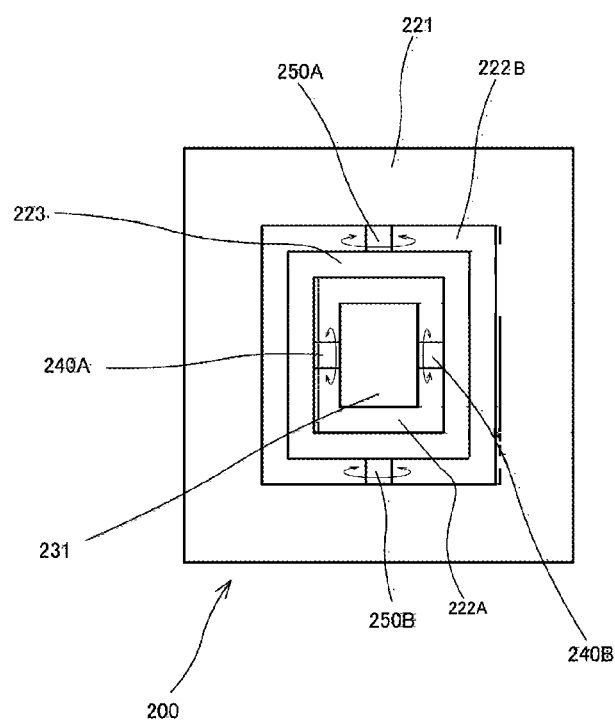
FIGS. 26a and 26b are a schematic enlarged top view and a schematic enlarged cross-sectional view for explaining a fundamental principle of conventional rotary optical deflectors.
Figure 26B:
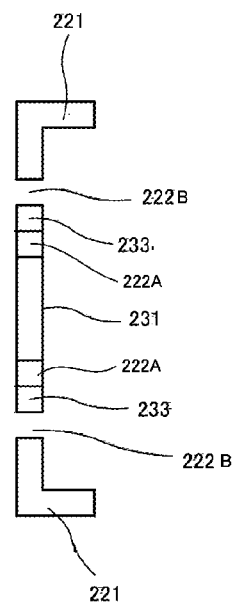

In addition, when the light intensity in the forward direction of the subject vehicle varies, the vehicle headlight 10 using the optical deflector apparatus can further improve a higher reliability and a longer life by changing the vertical scanning frequency FV2 using an exemplary preliminary prepared table in accordance with an exemplary flow chart as shown in FIG. 23. Thus, the disclosed subject matter can provide vehicle headlights using the optical deflector apparatus having a higher reliability and a longer life, which can be used as a lighting unit for vehicle lamps such as a headlight, and which can provide favorable light distribution patterns in accordance with various road conditions.

As described above, the optical deflector apparatus of the disclosed subject matter can enable at least the second pair of piezoelectric cantilever actuators to be driven by the AC voltage having a lower frequency, which cannot be used in the conventional optical deflector, and therefore can enjoy the high reliability and the long life such that can be used as a lighting unit for vehicle lamps such as a headlight. In addition, when the optical defector apparatus is incorporated into the headlight, the frequency of the AC voltage can further reduce in accordance with the speed of the subject vehicle and the light intensity in the forward direction of the subject vehicle using the control system.

Moreover, the optical deflector apparatus can scan light having various color tones including a while color tone by associating the wavelength converting member including the wavelength converting material with the light source such as a laser diode. The light having the various color tones can be projected as a desirable light distribution via the projector lens. Accordingly, the optical deflector apparatus having a high reliability and a long life of the disclosed subject matter can be used as a lighting unit for a stage lighting, a room lighting for warming up events, etc.

Furthermore, the vehicle headlight using the optical deflector apparatus having a high reliability and a long life can also provide various light distribution patterns for drivers and pedestrians in accordance with the road conditions without the flickers of light, even when the optical deflector apparatus is driven by the low frequency to maintain the high reliability and the long life. Thus, the disclosed subject matter can provide vehicle headlights using the optical deflector apparatus having a higher reliability and a longer life for driving safety.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. An illumination apparatus comprising:
    a laser light source;
    an optical deflector including,
        a mirror having first and second central axes perpendicular to one another, the mirror receiving a laser beam emitted by the light source and projecting a reflected laser beam,
        an inner frame having a first pair of piezoelectric cantilever actuators, the inner frame supporting the mirror, and configured to rotate the mirror about the first central axis by means of the first pair of piezoelectric cantilever actuators, and
        an outer frame having a second pair of piezoelectric cantilever actuators, the outer frame surrounding the inner frame, and being configured to rotate the inner frame and the mirror about the second central axis by means of the second pair of piezoelectric cantilever actuators, wherein at least one of the first pair of piezoelectric cantilever actuators and the second pair of piezoelectric cantilever actuators includes a plurality of piezoelectric cantilevers;

the optical deflector configured to produce an illumination pattern by scanning the reflected laser beam across an output area; and a control system including, a light source driver configured to power the laser light source, an optical deflector driver configured to drive the first pair of piezoelectric cantilever actuators with a first alternating-current (AC) voltage having a first frequency and a reverse phase of the first frequency, and to drive the second pair of piezoelectric cantilever actuators with a second AC voltage having a second frequency and a reverse phase of the second frequency, and a controller configured to control the light source driver and the optical deflector driver; and wherein the first frequency is higher than the second frequency, and a wave shape of a half cycle of the second AC voltage is a non-symmetric wave shape.

2. The illumination apparatus according to claim 1, further comprising:

a wavelength converting member including at least one wavelength converting material configured to pass through the reflected laser beam and being configured to wavelength-convert said reflected laser beam into light having a different wavelength from the reflected laser beam.

3. The illumination apparatus according to claim 2, wherein the laser light source is a laser device configured to emit blue light and the wavelength converting member includes a wavelength converting material that is selected from the group consisting of a yellow phosphor, and two phosphors including a red phosphor and a green phosphor.

4. The illumination apparatus according to claim 2, wherein the laser light source is a laser device configured to emit ultraviolet light and the wavelength converting member includes a wavelength converting material including at least one of a red phosphor, a green phosphor and a blue phosphor.

5. The illumination apparatus according to claim 2, further comprising:

a projector lens configured to allow the reflected laser beam to pass through.

6. A vehicle headlight including the illumination apparatus according to claim 2, further comprising:

a projector lens being configured to allow the reflected laser beam to pass through, wherein the first central axis of the mirror of the optical deflector is located in a substantially vertical direction with reference to a driving'road, the second central axis of the mirror of the optical deflector is located in a substantially horizontal direction with reference to the driving road, and the reflected laser beam is projected in a forward direction of the vehicle headlight via the projector lens.

7. The vehicle headlight including the illumination apparatus according to claim 6, further comprising:

a camera configured to take an image in a forward direction of a subject vehicle incorporating the vehicle headlight, and to output corresponding image data to the controller of the control system, wherein the controller is configured to vary at least a projecting shape of the illumination pattern in accordance with the image data by using the light source driver and the optical deflector driver.

8. The vehicle headlight including the illumination apparatus according to claim 6, further comprising:

a speed sensor configured to detect a speed of a subject vehicle incorporating the vehicle headlight and to output said speed data to the controller of the control system, wherein the controller is configured to vary the second frequency of the second AC voltage in accordance with the speed data by using the optical deflector driver.

9. The vehicle headlight including the illumination apparatus according to claim 6, further comprising:

a light intensity sensor configured to detect a light intensity in a light-emitting direction of the laser beam, and to output corresponding light intensity data to the controller of the control system, wherein the controller is configured to vary the second frequency of the second AC voltage in accordance with the light intensity data by using the optical deflector driver.

10. An illumination apparatus comprising:

a laser light source;

an optical deflector including, a mirror having first and second central axes perpendicular to one another, the mirror receiving a laser beam emitted by the light source and projecting a reflected laser beam, an inner frame having a first pair of piezoelectric cantilever actuators, the inner frame supporting the mirror, and configured to rotate the mirror about the first central axis by means of the first pair of piezoelectric cantilever actuators via a first pair of torsion bars connecting between the mirror and the inner frame, and an outer frame having a second pair of piezoelectric cantilever actuators, the outer frame supporting surrounding the inner frame, and configured to rotate the inner frame and the mirror about the second central axis by means of the second pair of piezoelectric cantilever actuators via a second pair of torsion bars connecting between the inner frame and the outer frame;

the optical deflector configured to produce an illumination pattern by scanning the reflected laser beam across an output area; and a control system including, a light source driver configured to power the laser light source, an optical deflector driver configured to drive the first pair of piezoelectric cantilever actuators with a first alternating-current (AC) voltage having a first frequency and a reverse phase of the first frequency, and to drive the second pair of piezoelectric cantilever actuators with a second AC voltage having a second frequency and a reverse phase of the second frequency, and a controller configured to control the light source driver and the optical deflector driver; and wherein the first frequency is higher than the second frequency, and the second frequency is a resonance frequency of less than 100 Hz, which is substantially a mechanical resonance frequency of the inner frame.

11. The illumination apparatus according to claim 10, wherein the laser light source is a laser device configured to emit blue light and the wavelength converting member includes a wavelength converting material selected from the group consisting of a yellow phosphor, and two phosphors including a red phosphor and a green phosphor.

12. The illumination apparatus according to claim 10, wherein the laser light source is a laser device configured to emit ultraviolet light and the wavelength converting member includes a wavelength converting material including at least one of a red phosphor, a green phosphor and a blue phosphor.

13. The illumination apparatus according to claim 10, further comprising:
a projector lens configured to allow the reflected laser beam to pass through.

14. The illumination apparatus according to claim 10, further comprising:
a wavelength converting member including at least one wavelength converting material configured to pass through the reflected laser beam, and configured to wavelength-convert said reflected laser beam into light having a different wavelength from the reflected laser beam.

15. A vehicle headlight including the illumination apparatus according to claim 14, further comprising:
a projector lens configured to allow the reflected laser beam to pass through, wherein the first central axis of the mirror of the optical deflector is located in a substantially vertical direction with reference to a driving road, the second central axis of the mirror of the optical deflector is located in a substantially horizontal direction with reference to the driving road, and the reflected laser beam is projected in a forward direction of the vehicle headlight via the projector lens.

16. The vehicle headlight including the illumination apparatus according to claim 15, further comprising:
a camera configured to take an image in a forward direction of a subject vehicle incorporating the vehicle headlight, and configured to output corresponding image data to the controller of the control system, wherein the controller is configured to vary at least a projecting shape of the illumination pattern in accordance with the image data by using the light source driver and the optical deflector driver.

17. The vehicle headlight including the illumination apparatus according to claim 15, further comprising:
a speed sensor configured to detect a speed of a subject vehicle incorporating the vehicle headlight and to output said speed data to the controller of the control system, wherein the controller is configured to vary the second frequency of the second AC voltage in accordance with the speed data by using the optical deflector driver.

18. The vehicle headlight including the illumination apparatus according to claim 15, further comprising:
a light intensity sensor configured to detect a light intensity in a light-emitting direction of the laser beam, and to output corresponding light intensity data to the controller of the control system, wherein the controller is configured to vary the second frequency of the second AC voltage in accordance with the light intensity data by using the optical deflector driver.

* * * * *